United States Patent
Shiomi

(10) Patent No.: US 6,344,876 B2
(45) Date of Patent: *Feb. 5, 2002

(54) IMAGE BLUR PREVENTING APPARATUS

(75) Inventor: Yasuhiko Shiomi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,359

(22) Filed: Nov. 18, 1997

(30) Foreign Application Priority Data

Nov. 19, 1996 (JP) ............................................. 8-322150

(51) Int. Cl.$^7$ .......................... H04N 5/228; G03B 17/00
(52) U.S. Cl. ......................................... 348/208; 396/55
(58) Field of Search .......................... 348/208; 359/554, 359/557; 396/52, 53, 55, 54

(56) References Cited

U.S. PATENT DOCUMENTS

| | | | | |
|---|---|---|---|---|
| 5,175,580 A | | 12/1992 | Shiomi ........................ 354/410 |
| 5,229,603 A | | 7/1993 | Shiomi ..................... 250/231.1 |
| 5,585,884 A | * | 12/1996 | Onuki ........................... 396/55 |
| 5,589,912 A | | 12/1996 | Shiomi ........................... 396/55 |
| 5,615,397 A | | 3/1997 | Shiomi et al. ................. 396/55 |
| 5,619,030 A | | 4/1997 | Shiomi ..................... 250/201.1 |
| 5,771,405 A | * | 6/1998 | Hirano ........................... 396/55 |
| 5,933,660 A | * | 8/1999 | Shiomi ........................... 396/55 |
| 5,953,544 A | * | 9/1999 | Kai et al. ....................... 396/55 |
| 6,035,133 A | * | 3/2000 | Shiomi ........................... 396/55 |
| 6,064,825 A | * | 5/2000 | Onuki ............................ 396/55 |
| 6,067,419 A | * | 5/2000 | Shiomi ........................... 396/55 |

FOREIGN PATENT DOCUMENTS

JP    4-163534    6/1992

* cited by examiner

Primary Examiner—Wendy R. Garber
Assistant Examiner—Luong Nguyen
(74) Attorney, Agent, or Firm—Fitzpatrick, Cella, Harper & Scinto

(57) ABSTRACT

An image blur prevention apparatus adapted to a camera having an exposure portion, includes a first image blur detecting device that detects an image blur state of the camera, a second image blur detecting device that detects an image blur state of an optical image of the camera, and outputs a detection signal, and a determining portion that determines a photographing operation state of the camera. A calculating device, having a first calculation program and a second calculation program, selects one calculation program from among the first and second calculating programs based on a determination result of the determining portion and based on the detection signal of the second image blur detection device, and calculates a predicted blur signal in accordance with the selected calculation program. An image blur prevention device then performs an image blur prevention operation based on the detection signal of the first image blur detecting device and the predicted blur signal calculated by the calculating device, during a light exposing operation onto the exposure portion of the camera.

10 Claims, 21 Drawing Sheets

FIG. 8A (HIGH-PASS CALCULATION)

$$H(S) = \frac{V_{OUT}}{V_{IN}} = \frac{SC_1R_1}{1+SC_1R_1}$$

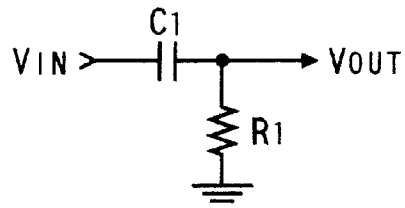

$$a_0 = \frac{\frac{2}{ts}}{\frac{1}{C_1R_1} + \frac{2}{ts}}$$

$$a_1 = \frac{-\frac{2}{ts}}{\frac{1}{C_1R_1} + \frac{2}{ts}}$$

$$b_1 = \frac{\frac{1}{C_1R_1} - \frac{2}{ts}}{\frac{1}{C_1R_1} + \frac{2}{ts}}$$

(SAMPLING TIME : ts)

FIG. 8B (INTEGRAL CALCULATION)

$$H(S) = \frac{V_{OUT}}{V_{IN}} = \frac{1}{1+SC_2R_2}$$

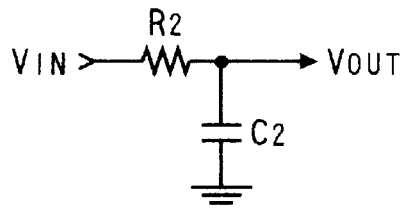

$$a_0 = \frac{\frac{1}{C_2R_2}}{\frac{1}{C_2R_2} + \frac{2}{ts}}$$

$$a_1 = \frac{\frac{1}{C_2R_2}}{\frac{1}{C_2R_2} + \frac{2}{ts}}$$

$$b_1 = \frac{\frac{1}{C_2R_2} - \frac{2}{ts}}{\frac{1}{C_2R_2} + \frac{2}{ts}}$$

(SAMPLING TIME : ts)

IMAGE BLUR PREVENTING APPARATUS

BACKGROUND OF THE INVENTION

1. Field of the Invention

This invention relates to an image blur preventing apparatus for preventing image blur caused by hand vibration or the like in a camera, an optical apparatus or the like.

2. Related Background Art

The construction of the essential portions of an example of a camera provided with a fluctuation preventing system is shown in FIG. 21 of the accompanying drawings. In FIG. 21, a CPU 301 in a camera body 300 governs the control of the whole camera, focus control and fluctuation preventing control. Focus control and fluctuation preventing control will hereinafter be described briefly.

The case of focus control will first be described. Incident light from an object entering through a focusing lens 306, a main photographing lens 305 and a fluctuation correction lens 304 is imaged on an image sensor 303 through a main mirror 307, an AF sub-mirror 308 and a field lens 309. The image formed on this image sensor 303 comprises two kinds of light beams passing through the different optical paths of the photographing optical system 305 by the conventional so-called pupil division system, and the defocus amount relative to a film surface 311 is detected from the amount of relative deviation of these two images on the image sensor 303, and the focusing lens 306 is moved in the direction of the optical axis thereof in accordance with this defocus amount to thereby realize focus control.

Description will now be made of a case where fluctuation correction control is effected. An image blur correction amount is calculated from the combination of a fluctuation signal output from a mechanical sensor 302 such as an angular speed sensor such as a vibration gyro or other angular acceleration sensor (or a linear acceleration sensor) and an image blur signal output found from the amount of movement of the image data formed on the image sensor 303 through the aforementioned respective optical systems during different times, and on the basis of this image blur correction amount, the correction lens 304 is actually driven in real time as indicated by the arrow to thereby prevent the blur of an image on the film surface 311 (an image formed when the mirror 307 and the sub-mirror 308 are retracted in actual exposure).

In the case of the above-described example of the prior art, however, it is possible to introduce the data of the object image into the image sensor 303 through the intermediary of the mirror 307 and the sub-mirror 308 before exposure, but during exposure, the mirror 307 and the sub-mirror 308 are retracted as a matter of course and therefore, the output from the image sensor 303 becomes unusable. As a countermeasure for this, as disclosed in Japanese Patent Application Laid-Open No. 4-163534, there is a method of simply detecting the image blur speed immediately before exposure is started, and simply linearly approximating the blur at that speed. Although this method is effective when the movement of the object or the vibration of a photographer is taking place at an equal speed, the effect of this method cannot be said to be sufficient when fluctuation is taking place at a predetermined cycle or when the shutter speed of a camera used is low.

SUMMARY OF THE INVENTION

It is the object of the present invention to provide a blur preventing control apparatus which can calculate an optimum predicted blur waveform for image blur control during exposure by the operational state or the state of fluctuation of a camera.

One aspect of the invention is an image blur preventing apparatus applicable to a camera which has an image blur detecting device for detecting an image blur state, a predicting portion for predicting the image blur state after a predetermined point of time on the basis of the detection output of the image blur detecting device at the point of time, and forming a predicted image blur signal corresponding to the image blur state, an image blur preventing device for performing an image blur preventing operation in accordance with the predicted image blur signal obtained by the predicting portion, and a changing portion for changing the manner of the prediction by the predicting portion in accordance with the photographing operation state of the camera, whereby optimum prediction is effected in accordance with the state of the camera.

Another aspect of the invention is a signal forming apparatus for use for the image blur prevention of a camera and for forming a signal corresponding to an image blur state which has an image blur detecting device for detecting an image blur state, a predicting portion for predicting the image blur state after a predetermined point of time on the basis of the detection output of the image blur detecting device at the predetermined point of time, and forming a predicted image blur signal corresponding to the image blur state, and a changing portion for changing the manner of the prediction by the predicting portion in accordance with the photographing operation state of the camera, or a camera having such a signal forming apparatus, whereby optimum prediction is effected in accordance with the state of the camera.

BRIEF DESCRIPTION OF THE DRAWINGS

FIGS. 8A and 8B illustrate the calculating methods during high-pass calculation and during integral calculation in the first embodiment of the present invention.

DESCRIPTION OF THE PREFERRED EMBODIMENTS

Figure 1:
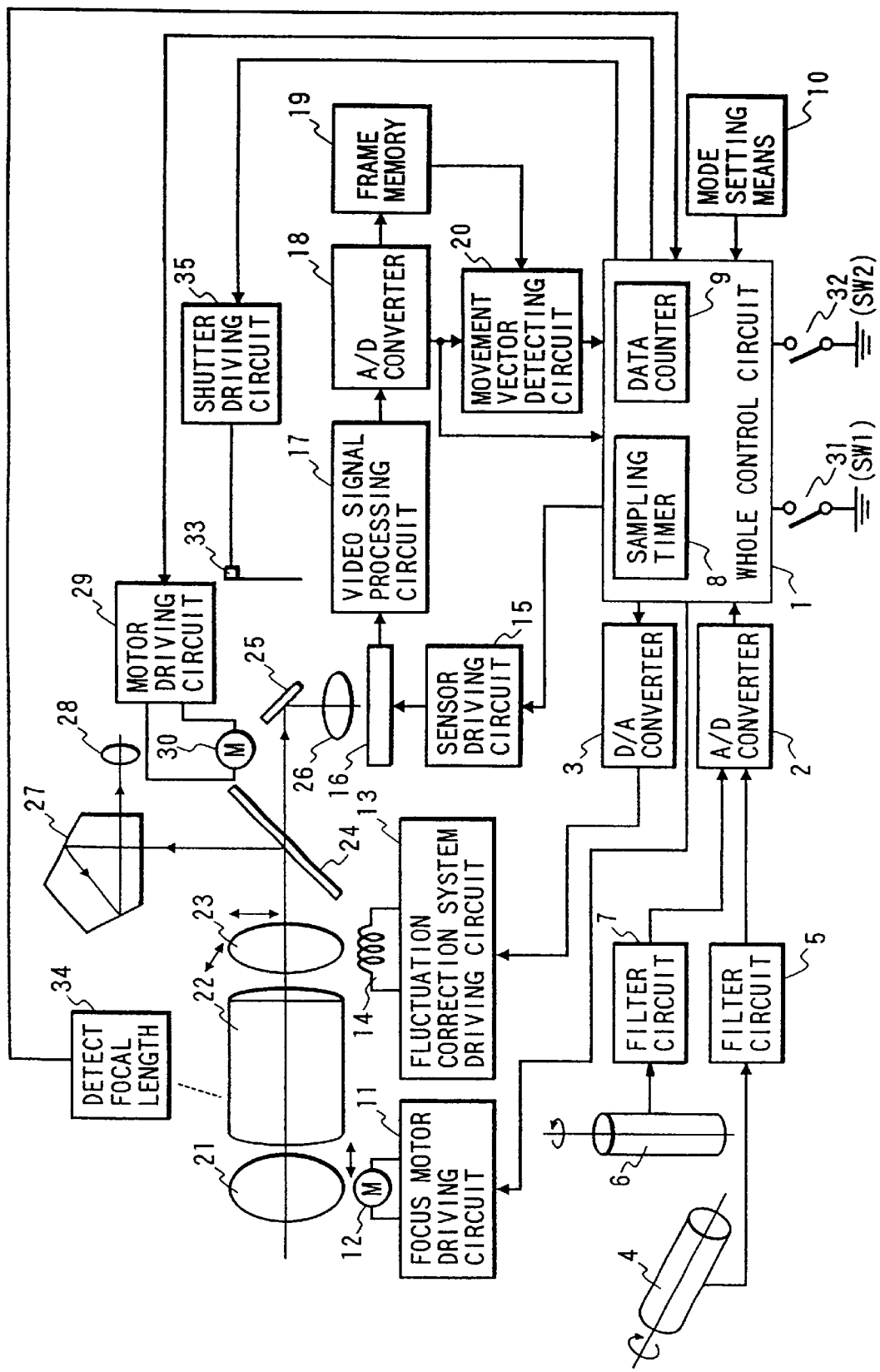
FIG. 1 is a block diagram showing the construction of the essential portions of a camera according to a first embodiment of the present invention.

The invention will hereinafter be described in detail with respect to some embodiments thereof shown in the drawings.

FIG. 1 is a block diagram showing the construction of the control circuit system of a camera provided with a fluctuation preventing apparatus according to a first embodiment of the present invention.

In FIG. 1, the reference numeral 1 designates a whole control circuit which governs the sequence of the whole, focus control and fluctuation correction control. The fluctuation output of a fluctuation sensor 4 (detection in a pitch direction) comprising a mechanical sensor such as a vibration gyro is inputted to an A/D converter 2 through a filter circuit 5, whereby it is converted into digital data and introduced into the whole control circuit 1. Likewise, the output of a fluctuation sensor 6 (detection in a yaw direction) is inputted to the A/D converter 2 through a filter circuit 7, and is introduced as digital data into the whole control circuit 1. The whole control circuit 1 has therein a sampling timer 8 for setting the timing for introducing the data from the A/D converter 2 at each predetermined time and effecting fluctuation correction calculation, and outputs the result of the fluctuation correction calculation to a D/A converter 3 on the basis of this timing. The D/A converter 3 outputs an analog voltage proportional to the input data, and this output voltage is outputted to a fluctuation correction system driving circuit 13, and the supply of a predetermined electric current to a correction system actuator coil 14 is effected and thus, a correction lens 23 is driven in a direction indicated by the arrow.

On the other hand, the incident light from an object enters a main mirror 24 through a focusing lens 21, a main photographing lens 22 and a correction lens 23, and part of the incident light passing through the half mirror portion thereof is reflected by an AF sub-mirror 25 and finally enters an image sensor 16 through a field lens 26. An image sensor 16 is driven from the whole control circuit 1 through a sensor driving circuit 15, and the output signal thereof is sequentially input to a video signal processing circuit 17. The signal output from this video signal processing circuit 17 is converted into digital data by an A/D converter 18, the output of which is output to the whole control circuit 1, a frame memory 19 and a movement vector detecting circuit 20.

Accordingly, as will be described later, in the case of focus control, the image data from the A/D converter 18 is directly introduced into the whole control circuit 1, and a defocus amount is calculated from the amount of deviation of two images by light beams passing through two different routes in the photographing optical system, and or the basis of this defocus amount, electric power is supplied to a focus motor 12 by a motor driving circuit 11 to thereby drive the focusing lens 21, thus effecting focus adjustment.

Also, in the case of fluctuation detection, as will be described later, a fluctuation vector is calculated from the relation between the output from the A/D converter 18 and the output of the frame memory 19, i.e., the correlation between the image data at different timings, by the movement vector detecting circuit 20. This fluctuation vector is output to the D/A converter 3 in combination with the aforementioned fluctuation sensor output, and the fluctuation correction lens 23 is likewise driven.

Also, the timing control of a shutter curtain 33 (comprised of a leading curtain and a trailing curtain) is effected by the control signal from the whole control circuit 1 through a shutter driving circuit 35, and the supply of electric power to a motor 30 is effected by the control signal from the whole control circuit 1 through a motor driving circuit 29, and the driving of the main mirror 24 and the sub-mirror 25, film feeding, etc. are executed. Also, the incident light from the object totally reflected by the main mirror 24 is directed to a photographer through a finder optical system comprised of a prism 27 and an eyepiece 28.

In addition, this camera is provided with mode setting means 10 for setting the photographing mode, etc., switches 31 (SW1) and 32 (SW2) actuated upon the operation of the release button of the camera, and focal length detecting means 34 for detecting the focal length of the photographing lens 22.

The actual operation of the camera will now be described with reference chiefly to a main flowchart shown in FIGS. 2 and 3.

Figure 2:
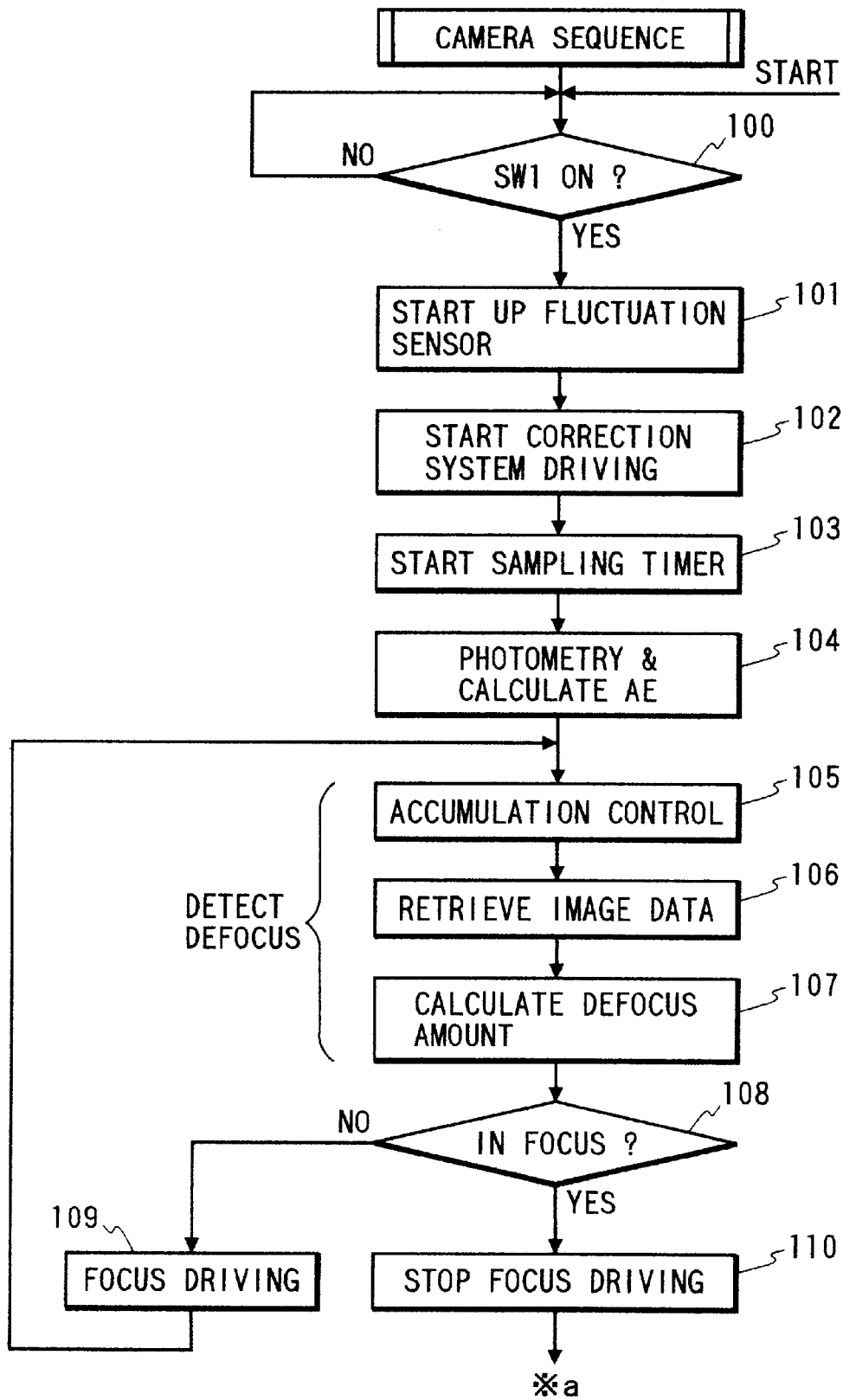
FIG. 2 is a flowchart showing a series of operations of the camera according to the first embodiment of the present invention.

In FIG. 2, first at a step #100, whether the switch SW1 of the camera designated by 31 in FIG. 1 is ON is judged, and if it is ON, shift is made to a step #101, where the actuation of the fluctuation sensors 4 and 6 of mechanical construction is started.

Here, the specific construction of the fluctuation sensor 4 and filter circuit 5 (or the fluctuation sensor 6 and filter circuit 7) of FIG. 1 will be described with reference to the circuit diagram of FIG. 4.

Figure 4:
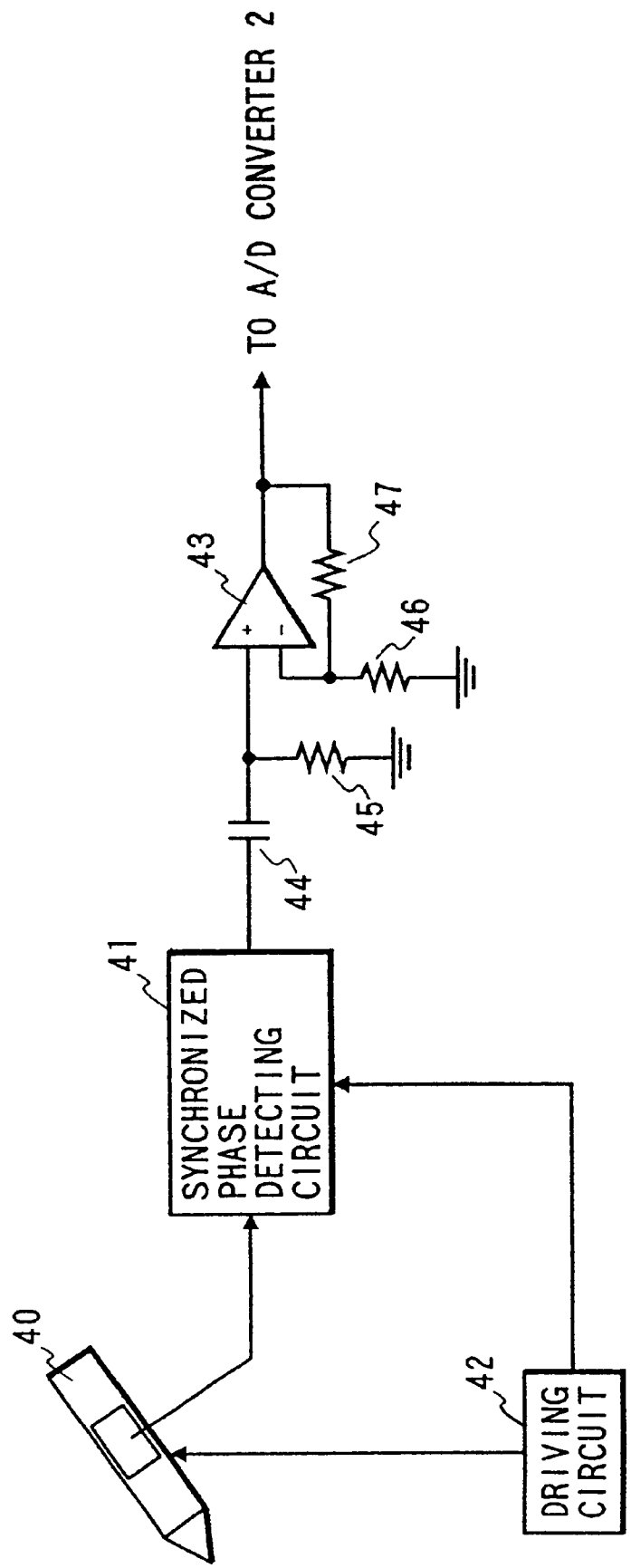
FIG. 4 is a circuit diagram showing a filter circuit disposed at the rear stage when a vibration gyro is used as an example of a fluctuation sensor shown in FIG. 1.

FIG. 4 is a diagram when a conventional vibration gyro 40 is used as the fluctuation sensor, and a vibration is resonating in the vicinity of the resonance frequency thereof through a synchronized phase detecting circuit 41 and a driving circuit 42. A fluctuation angular speed signal proportional to Corioli's force modulated at that resonance frequency is detected by the synchronized phase detecting circuit 41, whereby only an ordinary angular speed signal is taken out. Usually, in the output after this detection of the synchronized phase, there is an offset voltage (a null voltage) even in the state of angular speed 0, and in order to remove this unnecessary DC voltage component, design is made such that an analog high-pass filter circuit comprising an OP amplifier 43, a capacitor 44 and resistors 45 to 47 cuts components below a predetermined frequency (a cut-off frequency determined by the capacitor 44 and the resistor 45) and only the remaining signal component is input to the A/D converter 2 of FIG. 1.

Turning back to FIG. 2, at a step #102, the supply of electric power to the fluctuation correction system denoted by 13 and 14 in FIG. 1 is effected to thereby start the driving of the correction lens 23, and this specific construction will now be described on the basis of the mechanical construction of FIG. 5.

Figure 5:
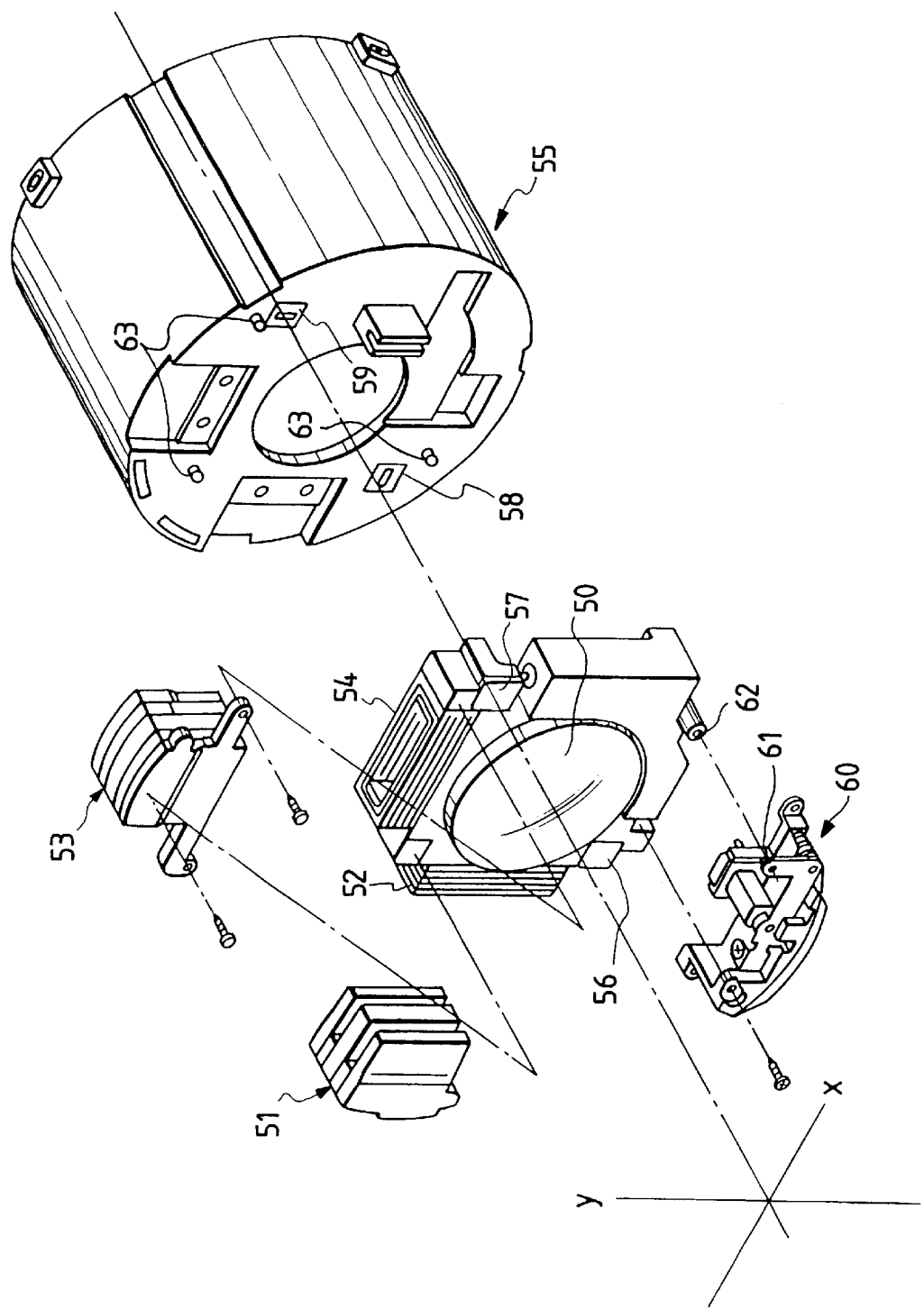
FIG. 5 is a perspective view showing an example of the construction of a fluctuation correction system according to the first embodiment of the present invention.

In FIG. 5, the reference numeral 50 designates a correction lens system corresponding to the correction lens 23 of FIG. 1 and freely movable on a plane perpendicular to the optical axis thereof by a method as will be described later. This correction lens system 50, for movement in the direction of the x-axis indicated in FIG. 5, is freely operated by the amount and direction of electric current supplied to a winding coil 52 in a magnetic circuit unit comprised of a magnetic member 51 comprising a magnet and a yoke portion and the winding coil 52; likewise, for movement in the direction of the y-axis, the system is operated by the combination of a magnetic member 53 comprising a magnet and a yoke portion and a magnetic circuit unit comprised of a winding coil 54.

On the other hand, design is made such that the amount of movement of such a correction lens system 50 relative to a lens barrel support frame 55 is detected in non-contact by the combination of IREDs 56 and 57 movable with the correction lens system 50 and PSDs 58 and 59 fixedly mounted on the lens barrel support frame. The reference numeral 60 denotes a mechanical lock mechanism for mechanically locking the movement of the correction system, and depending on the direction of supply of electric current to a magnet annexed to it, the projected portion 61 of the mechanical lock member jumps into or out of a depressed portion 62 movable with the correction lens system 50, thereby effecting lock/unlock.

The reference numeral 63 designates a support ball as a door stop for regulating the movement of the shift correction lens system 50 in the direction of inclination.

Next, at the step #103 of FIG. 2, the time counting operation of a sampling timer 8 in the whole control circuit 1 of FIG. 1 is started to sampling-control the correction system at predetermined time intervals on the basis of the above-described fluctuation sensor output.

Here, the interrupted processing of the sampling timer 8 will be described with reference to the flowchart of FIG. 6.

Figure 3:
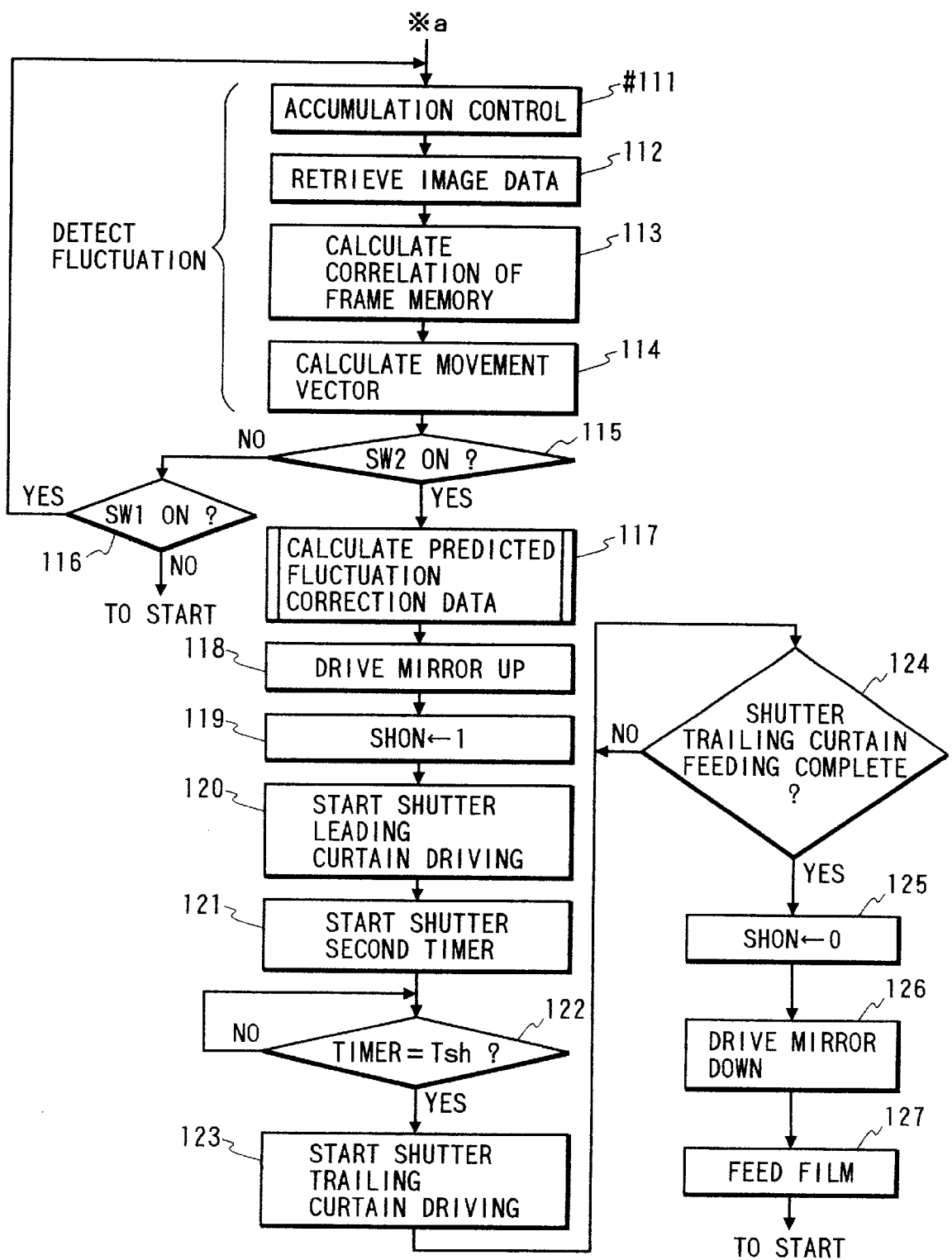
FIG. 3 is a flowchart showing the continuation of the operations of FIG. 2.
Figure 6:
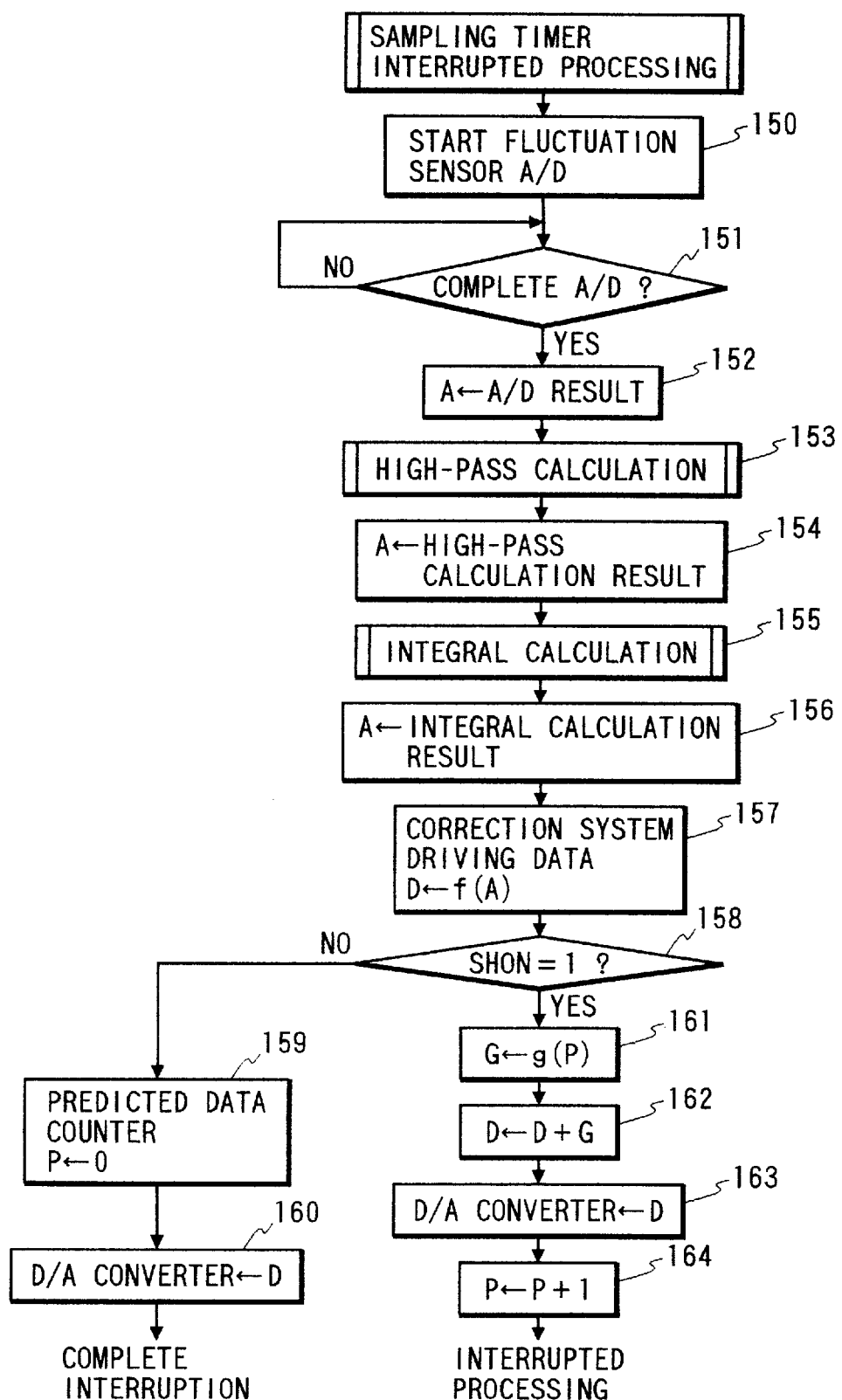
FIG. 6 is a flowchart showing the sampling timer interrupted processing in the first embodiment of the present invention.

As regards the interrupted processing of FIG. 6, each time the sampling timer 8 counts a predetermined time ts, the operation of the main flowcharts of FIGS. 2 and 3 is temporarily interrupted and the processing is preferentially executed, and the signal processing of the fluctuation sensors 4 and 6 of FIG. 1 and the driving control of the correction lens 23 are effected.

First, at a step #150, the A/D conversion of the output of the fluctuation sensor 4 (and 6) after the passage thereof through the filter circuit 5 (and 7) is started through the A/D converter 2, and when it is detected at the next step #151 that the conversion has been completed, the result of the conversion is transferred to an internal A register at the next step #152. At the next step #153, high-pass calculation for removing in the fashion of digital calculation the DC component of the data corresponding to this fluctuation sensor output which cannot be taken out by the analog high-pass filter shown in FIG. 4 is executed.

Figure 7:
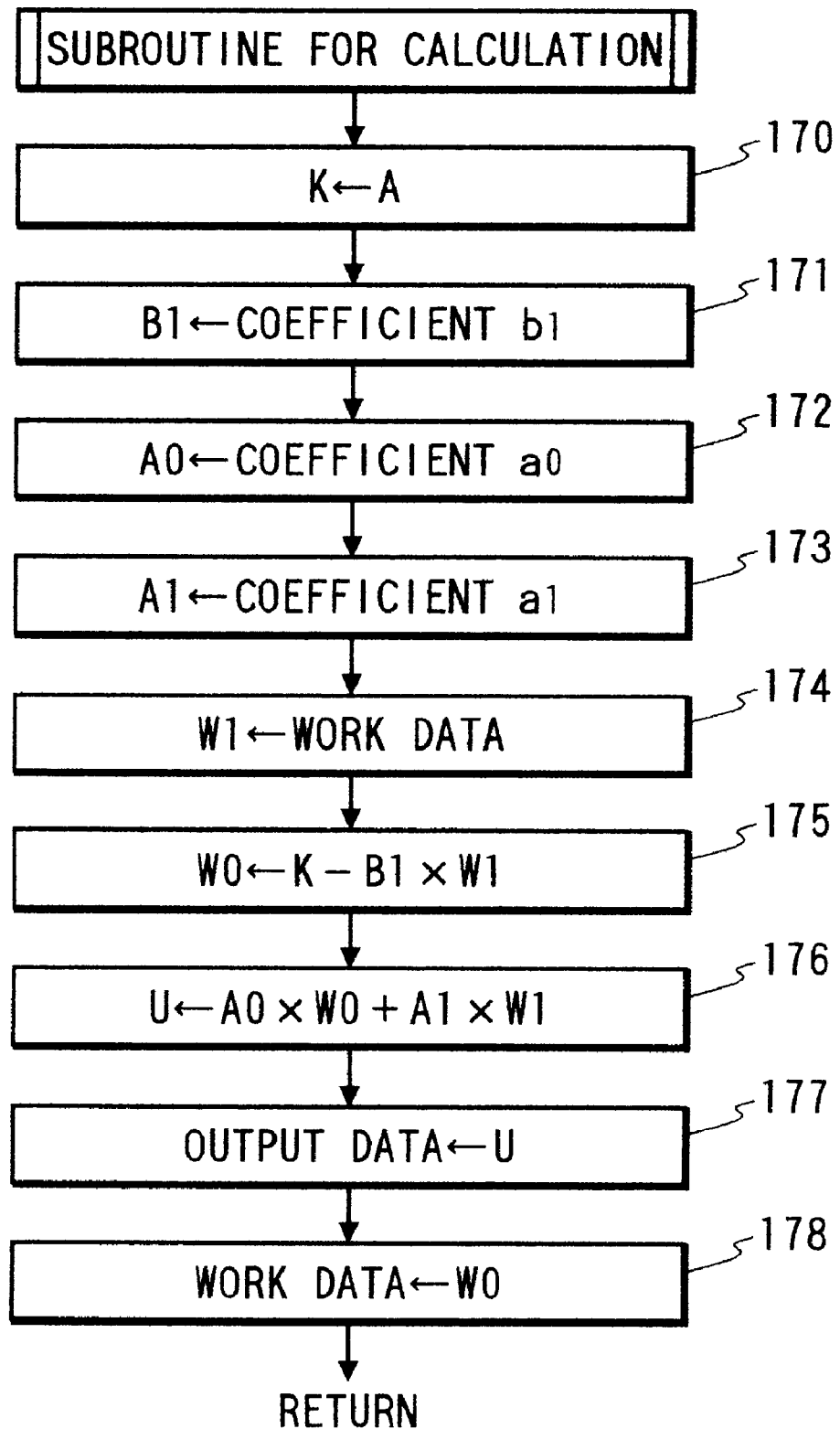
FIG. 7 is a flowchart showing the operation during high-pass calculation in the first; embodiment of the present invention.

The manner of this calculation will now be described with reference to the flowchart of FIG. 7. First, at a step #170, the value of the A register as input data is once transferred to a K register and next, at steps #171 to #173, as shown in FIG. 8A, the values of coefficient values $b_1$, $a_0$ and $a_1$ determined from the constants of an analog high-pass filter by conventional S-Z conversion are set in internal B1, A0 and A1 registers, respectively. Further, at a step #174, the value of work data of which the value has been set at the last sampling timing is transferred to a W register, and at the next step #175, the result of the multiplication of the B1 register by the W1 register is subtracted from the value of the K register in which the above-mentioned input data value is set, and the result thereof is set in a W0 register.

At the next step #176, the value of the multiplication of the W0 register by the A0 register and the value of the multiplication of the W1 register by the A1 register are added, and the result thereof is set in a U register, and at the next step #177, the value of this U register is output as the final high-pass calculation result. Lastly, at a step #178, the value of W0 is stored as the work data during the next sampling timing in an internal memory and this calculation subroutine is ended.

The result of such execution of the high pass calculation is once set in the A register at the step #154 of FIG. 6, and now at a step #155, integral calculation for converting an angular speed signal into an angular displacement signal is effected. A specific method of integral calculation is entirely similar to the above-described flowchart of FIG. 7. However, the coefficients set at the steps #171 to #173 of FIG. 7 are values found from an analog low-pass filter shown in FIG. 8B by S-Z conversion. Accordingly, detailed description is omitted here, and the final output after the integral calculation is again set in the A register at the step #156 of FIG. 6.

At the next step #157, the correction movement amount D is calculated from the content of the A register for this integral calculation result on the basis of a function f(A) (set by the integrated output and the map information of the zoom/focus position) with the degree of sensitivity of the correction system (the correction movement amount of the correction lens 23 relative to the detected angle is changed in accordance with the photographing system zoom and focus position) actually taken into account.

At the next step #158, whether a flag SHON indicating that an exposure sequence (the shutter opening-closing control of the camera) is actually going on is 1 is judged, and now the exposure sequence is not going on and the state of this flag is 0 and therefore, at a step #159, a fluctuation predicted data counter P used in the exposure sequence which will be described later is cleared to 0. Then, at a step #160, the fluctuation correction data D obtained at the step #157 is output to the D/A converter 3. As the result, an electric current based on the correction data is supplied to the actuator coil 14 through the fluctuation correction system driving circuit 13 and therefore, the correction lens 23 is correction-moved on the basis of a fluctuation signal.

Turning back again to the flowchart of FIG. 2, at a step #104, the luminance of the object is measured by a photometry circuit, not shown, and from this photometry value, the actual shutter speed and aperture value are determined by AE calculation. At the next steps #105 to #107, the detection of the defocus amount for effecting the focus adjustment of the object is executed by the image sensor 16 of FIG. 1; at the step #105, accumulation control to the image sensor 16 is effected, at the step #106, the sensor image is retrieved, and at the step #107, the actual defocus amount calculation is effected.

Here, the optical system and sensor construction for the specific defocus detection will be described with reference to FIGS. 9 and 10A to 10E.

Figure 9:
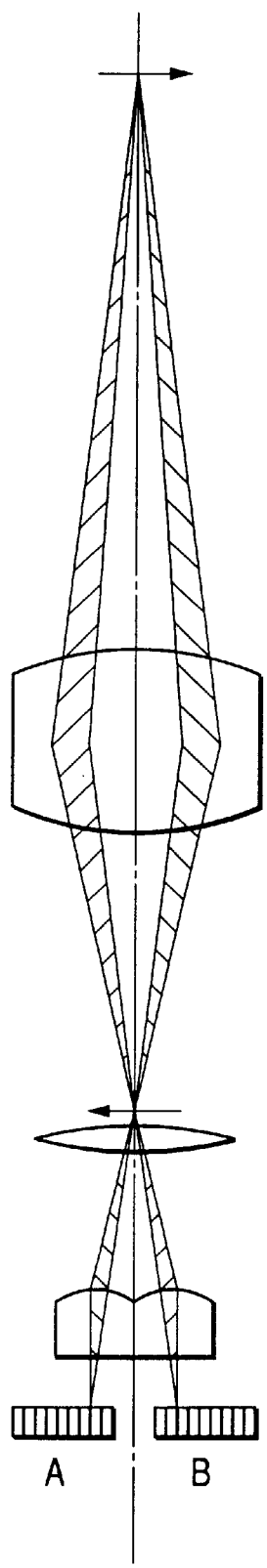
FIG. 9 shows an optical system for effecting defocus detection by a pupil division system in the first embodiment of the present invention.
Figure 10A:
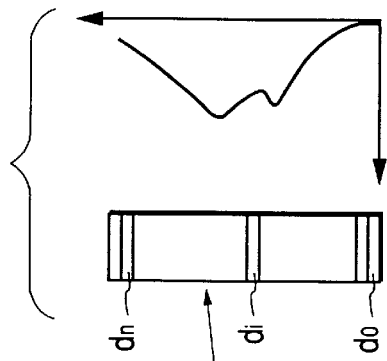
FIGS. 10A, 10B, 10C, 10D and 10E show the defocus states in each direction obtained when the optical system of FIG. 9 is used.
Figure 10B:
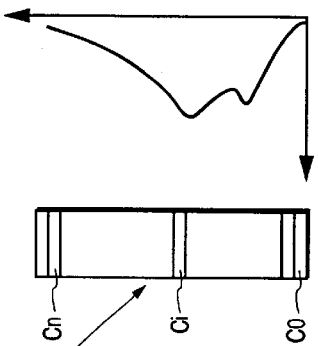
Figure 10C:
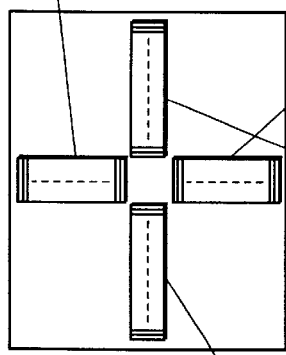
Figure 10D:
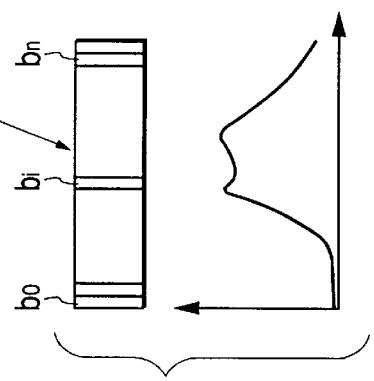
Figure 10E:
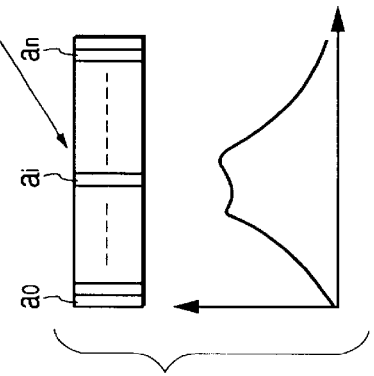

FIG. 9 shows an optical system for effecting defocus detection of the pupil division type utilizing the amount of relative deviation of light beams from the main object passing through the different areas of the photographing lens system on sensors A and B, and the defocus state of a pattern in a lateral direction is calculated from the amount of correlation (the relative relation between a and b when sensor pixels are deviated relative to one another) to the luminance information of a sensor group a (comprised of pixels $a_0, \ldots, a_n$) and a sensor group b (comprised of pixels $b_0, \ldots, b_n$) shown in FIGS. 10B and 10C, and the defocus state of a pattern in a vertical direction is calculated from the value of the amount of correlation to the luminance information of a sensor group c (comprised of pixels $c_0, \ldots, C_n$) and a sensor group d (comprised of pixels $d_0, \ldots, d_n$) shown in FIGS. 10D and 10E.

Figure 11:
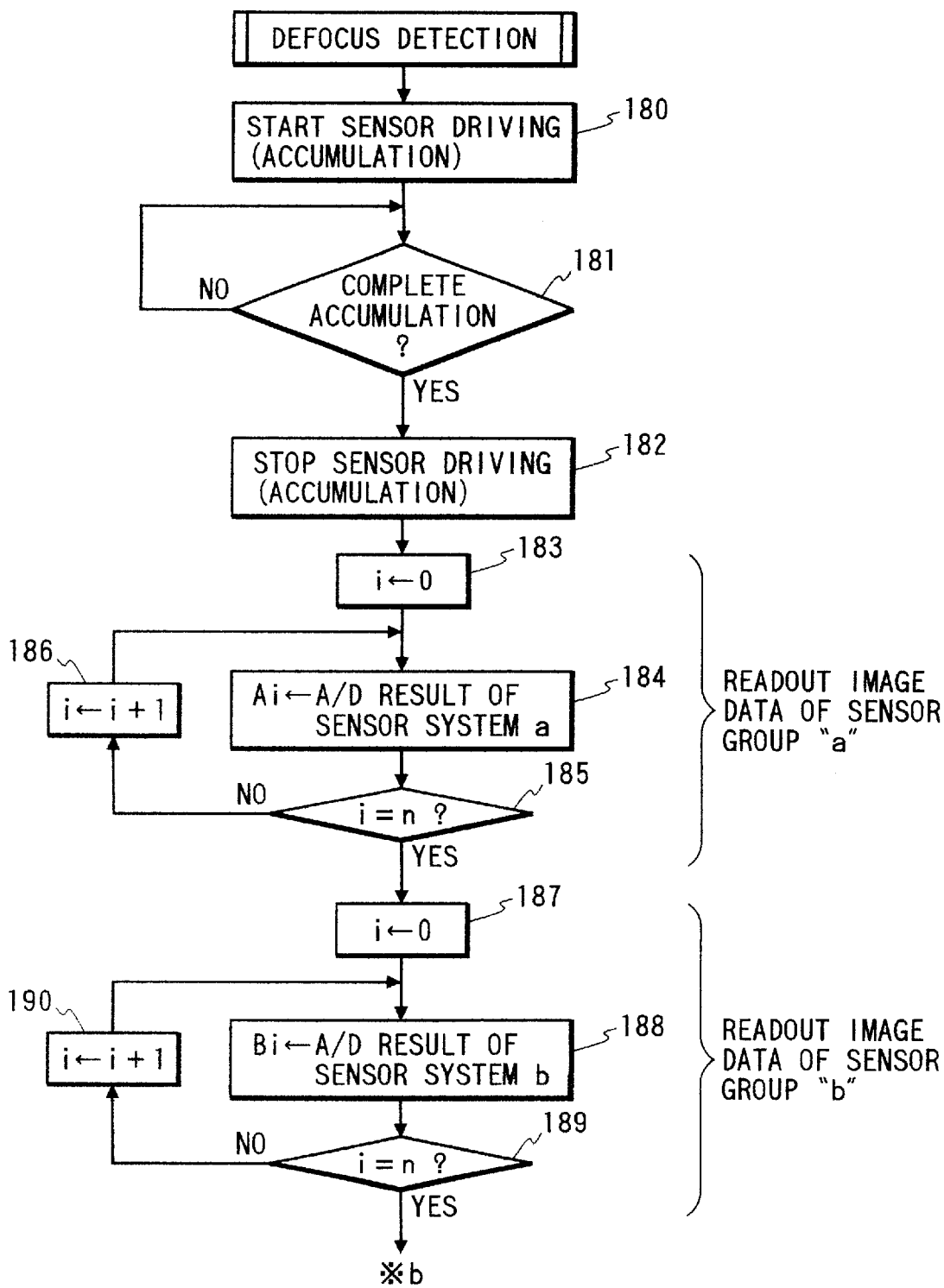
FIG. 11 is a flowchart showing the detailed operation during the defocus detection shown in FIG. 2.
Figure 12:
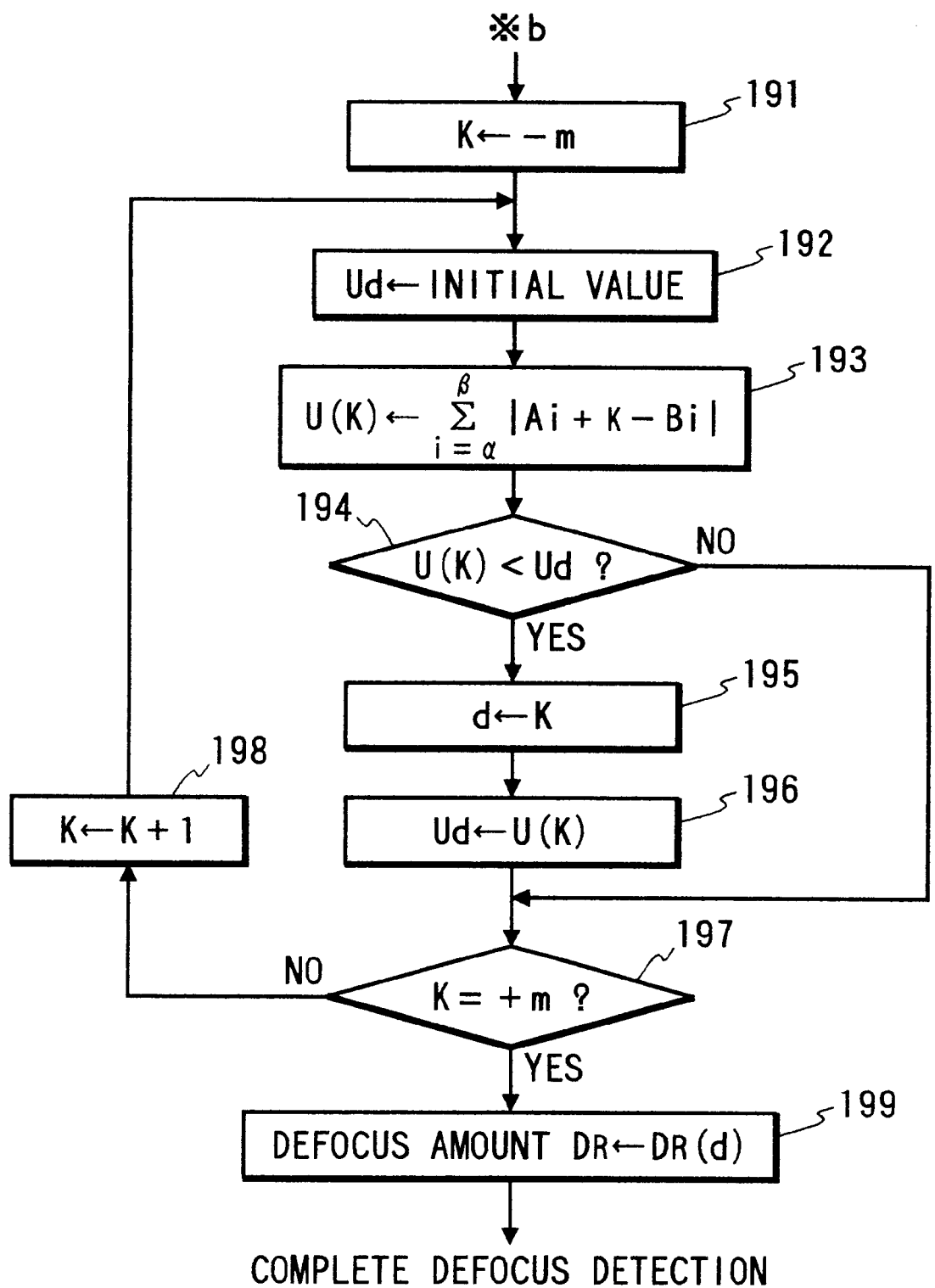
FIG. 12 is a flowchart showing the continuation of the operation of FIG. 11.

The detailed method of defocus detection shown at the steps #105 to #107 will now be described with reference to the flowcharts of FIGS. 11 and 12.

First, at a step #180, the accumulating operation to the image sensor 16 (corresponding to the sensor groups a to d of FIGS. 10B to 10E) is started through the sensor driving circuit 15. At the next step #181, whether the accumulation in the sensor has been completed is judged, and at a point of time whereat the accumulation has been completed, advance is made to a step #182, where the accumulating operation is stopped. At the next steps #183 to #186, the accumulated pixel data of the sensor group a is read out. That is, at the step #183, a counter i for indicating each pixel number is reset to 0, and at the next step #184, the luminance data of each pixel actually passed through the video signal processing circuit 17 is converted into digital data through the A/D converter 18, and the digital data is stored in an internal memory Ai. At the next step #185, whether the value of the counter i is equal to n is judged, and if it is equal to n, it is judged that the reading-out of all pixels of the sensor group has been terminated, but if it is not equal to n, shift is made to the step #186, where the value of the counter i is counted up by 1, and again shift is made to the step #184, where the A/D conversion of the next sensor pixel data is effected.

As described above, the image data reading-out operation of the sensor group a is performed, and to the sensor group b as well, the image data reading-out operation is quite likewise performed at steps #187 to #190.

A method of calculating the defocus amount from the correlative calculation of the pixel data of the sensor groups a and b will now be described with reference to the steps #191 to #199 of FIG. 12.

First, at the step #191, $-m$ (m>0) is set as an initial value in an internal counter K for actually setting the amount of relative image deviation of the sensor groups a and b, and at the next step #192, a predetermined initial value is substituted for Ud as the comparative data of correlative calculation result. At the step #193, data A is deviated by K relative to data B, and then the differential absolute value of each corresponding pixel is calculated from $A\alpha+K$ to $A\beta+K$ for A and from $B\alpha$ to $B\beta$ for B, and the result is stored as U(K) in memories Ai and Bi storing therein the pixel data of the sensor groups a and b.

Next, at the step #194, the value of U(K) is compared with the comparative data Ud, and if the value of U(K) is smaller, the value of K is stored in an internal memory d at the next step #195, and at the subsequent step #196, the value of U(K) is substituted for the comparative data Ud. Then, at the step #197, whether the value of the counter K is equal to +m is judged, and if it is not yet equal to +m, the value of the counter K is counted up by 1 at the step #198, and again shift is made to the step #192, where correlative calculation based on the new value of K is executed.

Finally, at the step #197, the correlative calculation is completed at a point of time whereat the value of K has become equal to +m, and a defocus amount $D_R$ calculated from a function $D_R(d)$ on the basis of the value of d storing therein the value of K when the degree of correlation is greatest (the value of U(K) becomes smallest) is output, and this detecting operation is completed.

Turning back again to FIG. 2, when the defocus detecting operation is completed as described above, at the next step #108, whether the lens is in focus is judged, and if it is not in focus, shift is made to a step #109, where the supply of electric power to the focus motor 12 is effected through the focus motor driving circuit 11 of FIG. 1, thereby driving the focusing lens 21 by the defocus amount $D_R$. Thereafter, the aforedescribed defocus detection of the steps #105 to #107 is again effected, and when the in-focus state is confirmed at the step #108, focus driving is stopped at a step #110, whereby focus control is completed.

In the foregoing, description has been made of only the sensor groups a and b, but what has been described above also holds true of the sensor groups c and d and therefore, these sensor groups need not be described here.

Figure 13:
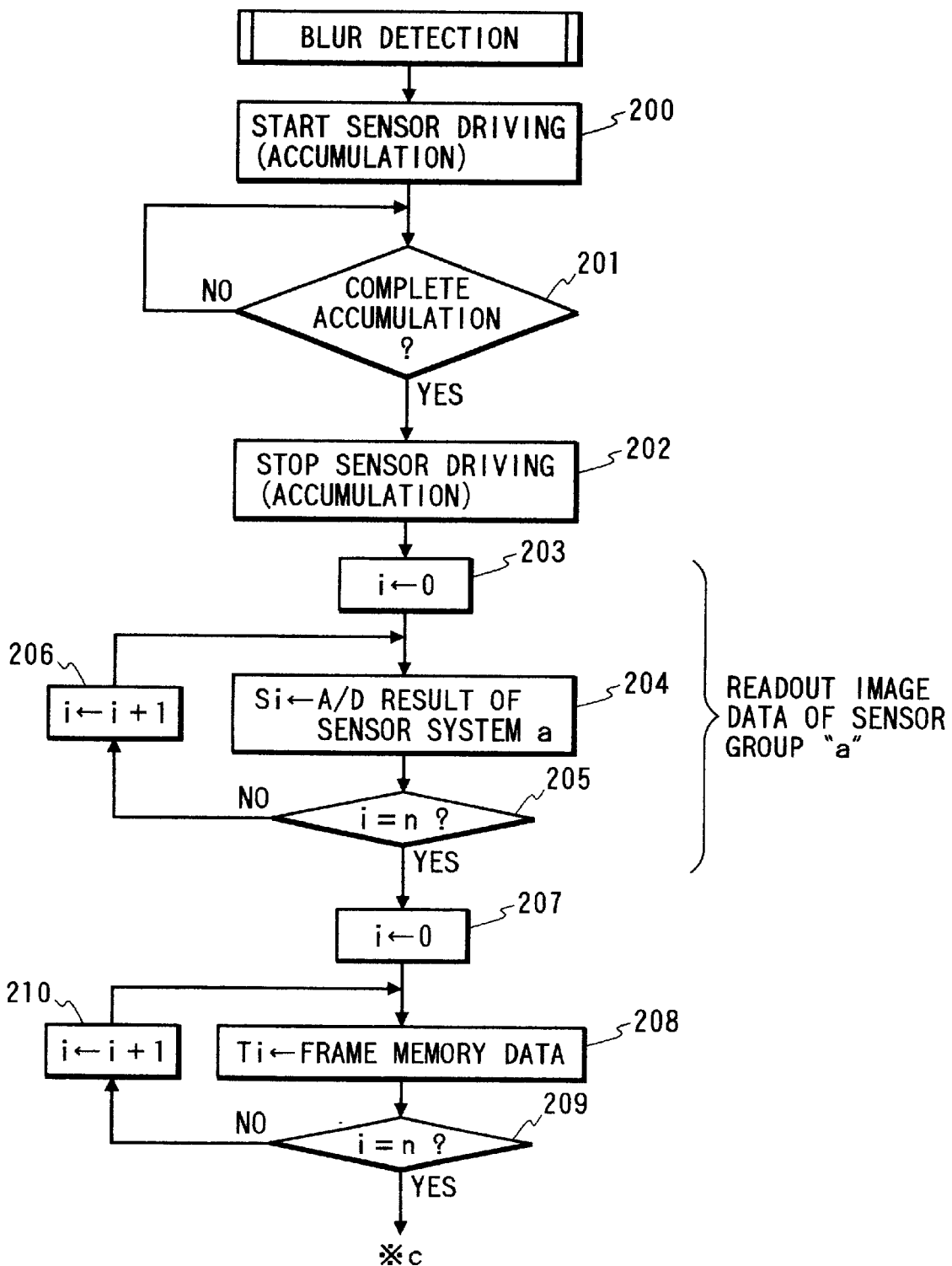
FIG. 13 is a flowchart showing the operation during the fluctuation detection shown in FIG. 3.

At steps #111 to #114 shown in FIG. 3, blur detection is effected on the basis of the image data from the image sensor 16. That is, at the step #111, the accumulation control of the sensor is effected, at the step #112, the sensor image data is retrieved, at the step #113, correlative calculation with the frame memory data in which the last image data is stored is effected, and at the step #114, the final movement vector amount is found; the detailed operation thereof will hereinafter be described with reference to the flowcharts of FIGS. 13 and 14.

First, at a step #200, the accumulation control of the image sensor 16 is started through the sensor driving circuit 15, and the detection of the object image is effected through the optical systems 21, 22, 23, the mirrors 24, 25 and the AF optical system 26 shown in FIG. 1. Then, at the next step #201, whether the accumulation has been completed is judged; the accumulation is regarded as having been completed by the detection of the fact that a predetermined level has been reached. At the next step #202, the sensor driving (accumulation) operation is stopped.

At steps #203 to #206, the operation of reading out the pixel data of the sensor group a shown in FIG. 10B successively is started. First, at the step #203, a counter i for indicating each pixel number is reset to 0, and at the next step #204, the luminance data of each pixel actually passed through the video signal processing circuit 17 is converted into digital data through the A/D converter 18, and the digital data is stored in an internal memory Si. At the next step #205, whether the value of the counter i is equal to n is judged, and if it is not equal to n, shift is made to a step #206, where the value of the counter i is counted up by 1, and again at the step #204, the sensor pixel data is retrieved. Also, at a point of time whereat the value of the counter i has become equal to n at the step #205, the retrieval (the conversion into digital data) of all pixel data of the sensor group a is regarded as having been completed, and shift is made to a step #207, where the image data during the last sampling is transferred from the frame memory 19 to an internal memory Ti. At steps #208 to #210, the value of the counter i changes from 0 to n, and the transfer of all pixel data is effected.

Description will now be made of a method of detecting the movement of the actual object image from the correlation between two image data of the sensor group a spaced apart by a predetermined time from each other.

Figure 14:
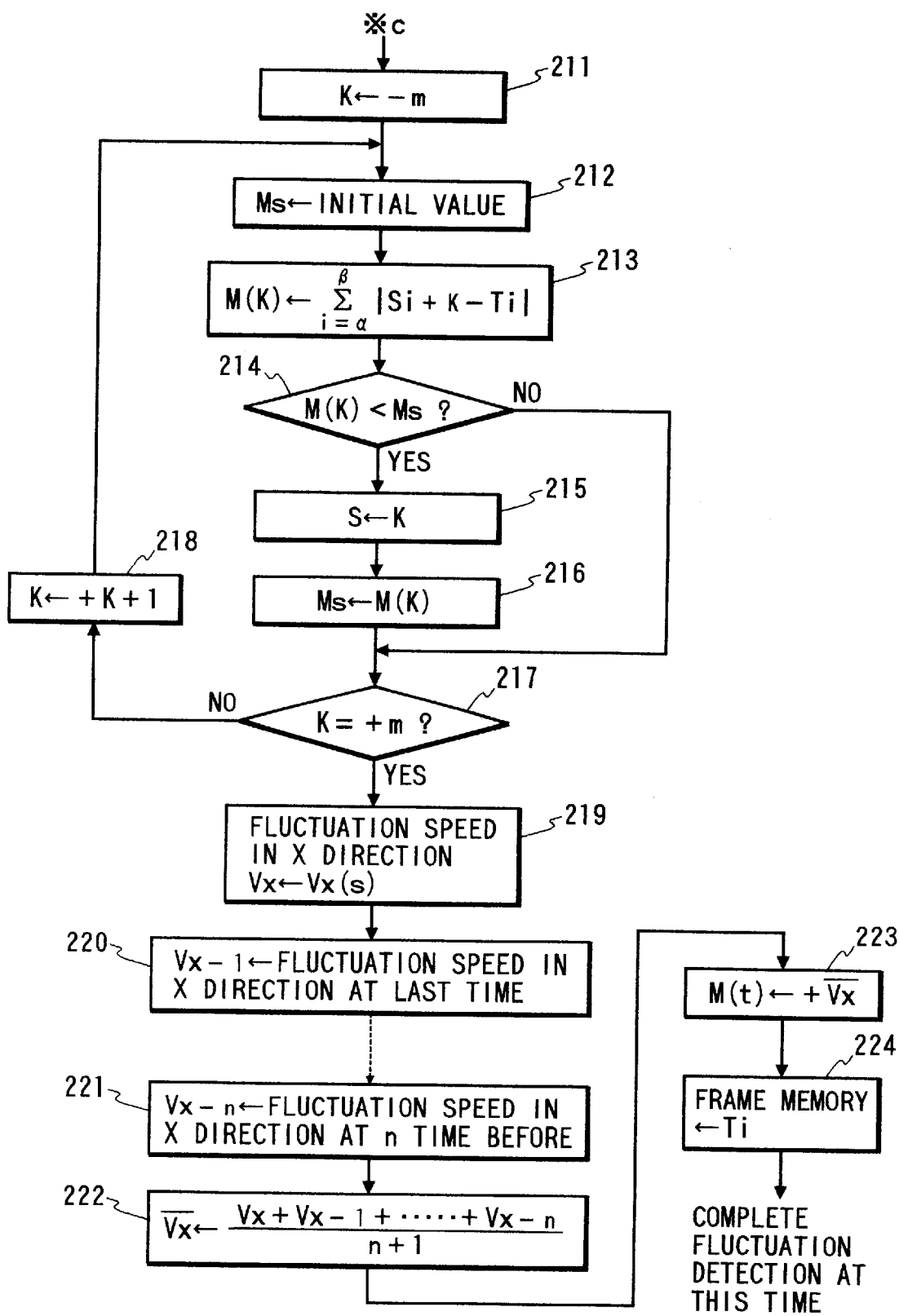
FIG. 14 is a flowchart showing the continuation of the operation of FIG. 13.

First, at the step #211 of FIG. 14, −m (m>0) is set as an initial value in the internal counter K for setting the relative image deviation amount of the image data Si of the sensor group actually retrieved during the current sampling and the image data Ti of the sensor group b retrieved during the last sampling, and at the next step #212, a predetermined initial value is substituted for Ms as the comparative data of correlative calculation result. At the next step #213, data S is deviated by K relative to data T between the memories Si and Ti storing therein the pixel data of the sensor group a during the current sampling and during the last sampling, whereafter the sum of the differential absolute values of the respective corresponding pixels is calculated from Sα+K to Sβ+K for S, and from Tα to Tβ for T, and the result thereof is stored as M(K).

Next, at a step #214, the value of M(K) is compared with comparative data Ms, and if the value of M(K) is smaller, at the next step #215, the value of K is stored in an internal memory S, and at the next step #216, the value of M(K) is substituted for the comparative data Ms. At the next step #217, whether the value of the counter K is equal to +m is judged, and if it is not yet equal to +m, at a step #218, the value of the counter K is counted up by 1, and again shift is made to the step #212, where correlative calculation based on the new value of K is effected.

Finally, at a point of time whereat the value of K has become equal to +m at the step #217, the correlative calculation is completed, and the value of S storing therein the value of K when the degree of correlation is greatest (the value of M(K) becomes smallest) is found. This value of S represents the amount of movement of the object image on the sensor group a when a predetermined time interval is given, that is, is indicative of the x direction (yaw direction) component of the movement vector speed of the image.

Accordingly, at a step #219, the blur speed $V_x$ in the x direction is calculated from a function $V_x(S)$ with the value of S as a variable.

Subsequently, at a step #220, a fluctuation speed $V_{x-1}$ determined at the last sampling timing is read out, and at a step #221, a fluctuation speed $V_{x-n}$ determined at sampling timing n times before is read out, whereafter at a step #222, the average value of the fluctuation speeds at total (n+1) times from $V_x$ to $V_{x-n}$ at n times before is calculated as $V_x$, and at a step #223, the average value of the image blur movement vectors found at the final current sampling is set in a memory M(t), and lastly at a step #224, the current image data is stored in the frame memory 19 for the next fluctuation speed detection.

Blur detection in the y direction can be accomplished by a method entirely similar to that in the processing in the x direction by the use of the sensor group c or d and therefore, need not be described here.

Turning back to FIG. 3, at a step #115, whether the switch SW2 of the camera is ON is judged, and if it is still OFF, at a step #116, whether the switch SW1 is ON is judged, and if it is ON, shift is again made to the step #111, where the blur detecting operation is performed, but if the switch SW1 is OFF, return is made to the step #100 which is the START position.

On the other hand, if at the step #115, the switch SW2 (the switch 32 of FIG. 1) is ON, the photographer is regarded as having performed the shutter release operation and shift is made to a step #117, where calculation for calculating predicted fluctuation data during exposure on the basis of the fluctuation data of the above-described image sensor 16 is started.

Here, the actual predicted fluctuation correction data calculation will be described with reference to the flowcharts of FIGS. 15 and 16.

First, at a step #230, whether the photographing mode of the mode setting means 10 of the camera body is the panning mode (a mode in which an object moving at a constant speed is photographed while the camera side is actually moved at the same speed as if the main object was made stationary and the back ground was moved) which is one of special photographing modes is judged, and if this mode is selected, shift is made to a step #233, where the value of the image blur movement vector speed M(t) detected by the afore-described method is set in an internal register A.

At the next step #234, an address counter P for storing a predicted fluctuation waveform in a memory is reset to 0, and at the subsequent step #235, the value of the image blur movement vector speed in the internal register A, the sampling interval ts when the correction system is actually controlled during exposure, and the result of the multiplication of all values of the address counter P are set in an internal memory g(P). This creates a predicted fluctuation waveform which increases/decreases monotonously (a predetermined inclination) on the basis of the average image blur movement speed immediately before the switch SW2 becomes ON. At the next step #236, the value of P is counted up by 1, and at the subsequent step #237, whether the value of P exceeds a predetermined value $P_{MAX}$ is judged, and if it does not exceed the predetermined value $P_{MAX}$, shift is again made to the step #235, where predicted data corresponding to the value of the next P is set in the memory g(P). At a point of time whereat the value of P has exceeded $P_{MAX}$, this operation is ended.

Figure 17:
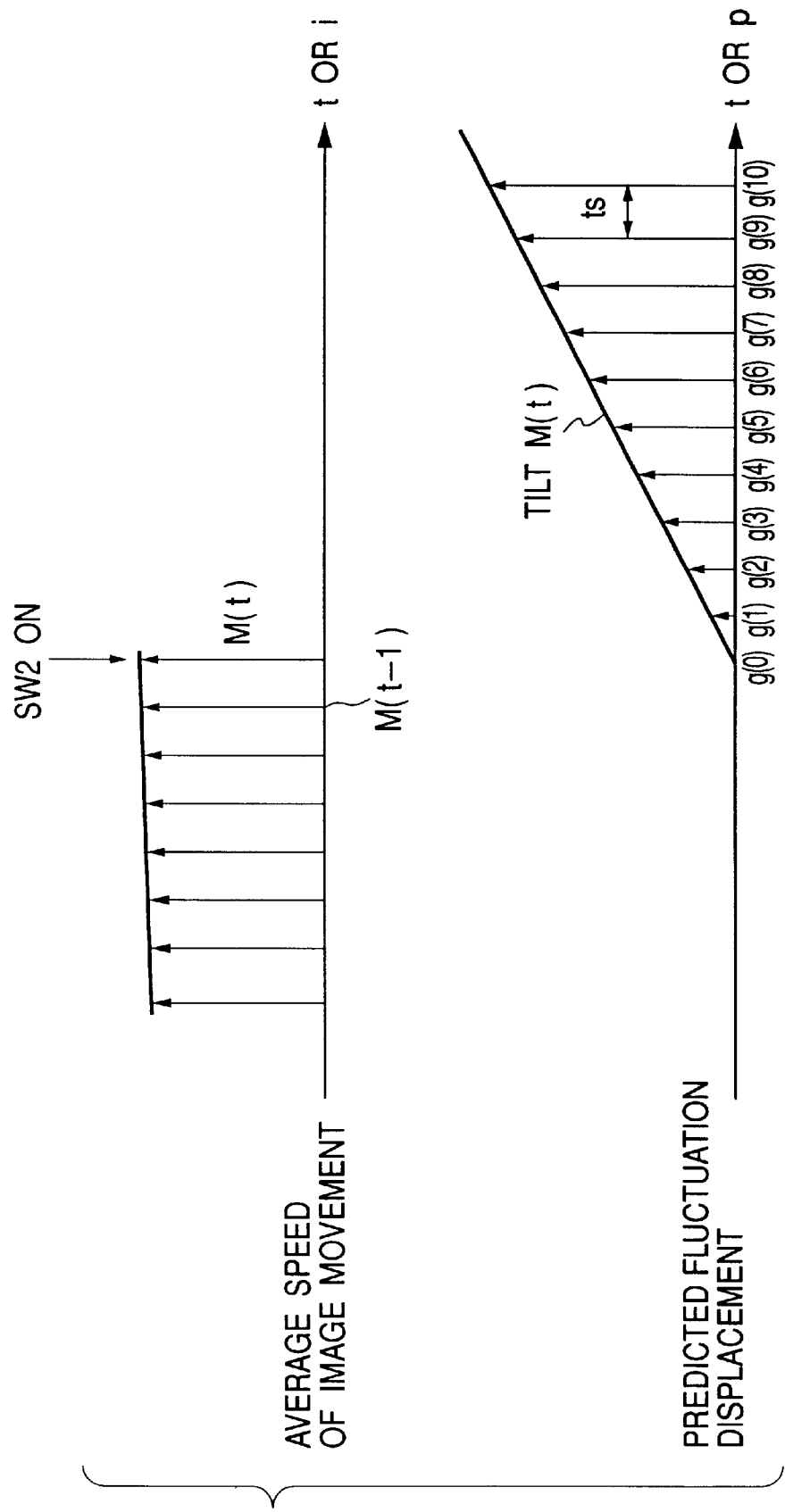
FIG. 17 aids the illustration of the predicted fluctuation correction data calculation of FIGS. 15 and 16.

It is FIG. 17 that shows the predicted fluctuation waveform prepared by such a method, and the inclination of displacement is M(t). This waveform data is added to the output of the mechanical fluctuation sensor in accordance with the actual shutter release timing as will be described later, and the correction lens 23 is driven in accordance with the added output.

On the other hand, if at the step #230, the photographing mode is not the panning mode, which is one of a number of special modes, at the next step #231, whether the photographing shutter speed determined by the photometry and AE calculation of the step #104 of FIG. 2 is longer than a predetermined shutter speed Tsha is judged, and if this is shorter than the predetermined shutter speed Tsha, the operations of the above-described steps #233 to #237 are executed to thereby make a simple predicted fluctuation waveform in which the displacement output linearly changes. This is due to the fact that the object fluctuation or the like can be sufficiently corrected in terms of probability even if the predicted waveform when the shutter speed is short to a certain degree is not especially made into a complicated waveform.

Also, if at the step #231, the photographing shutter speed is longer than the predetermined value Tsha, shift is made to a step #232, where whether the value of the focal length detecting means 34 of the photographing lens system of FIG. 1 is longer than a predetermined focal length fα is judged. If the focal length of the photographing lens is not longer than fα, it is judged that even if the shutter speed is long, sufficient object fluctuation correction can be accomplished even in the case of the above-described simple predicted fluctuation waveform because the focal length is short, and shift is made to the step #233 and subsequent steps.

On the other hand, if at the step #232, the focal length of the photographing lens is longer than the predetermined value fα, the shutter speed used is also long and the focal length is also long and therefore, a sufficient fluctuation correction effect may not be obtained by a simple predicted fluctuation waveform, and a small degree of complication in the predicted fluctuation waveform becomes necessary.

The method in this case will hereinafter be described with reference to the flowchart of a step #238 and subsequent steps.

First, at the step #238, the value of the image blur movement vector speed M(t) at the current point of time detected by the image sensor 16 by the use of the afore-described method is transferred to A register and at the same time, at steps #239 and #240, the value of this A register is set as an initial value in internal memories MAX and MIN. At the next step #241, data address setting counters i and j are reset to 0, and at a step #242, the value of a memory M(t−i) (the values of M(t), M(t−1), M(t−2), ..., M(t−m) are successively read out by a method which will be described later) is transferred to B register, and at a step #243, the value of this B register is compared with the internal memory MAX. If the value of B is not greater than the internal memory MAX, shift is directly made to a step #246, but if the value of B is greater than the internal memory MAX, at step #244, the value of B is first substituted for MAX, and the value of the data address counter i is set in an internal register E.

Also, at the step #246, the value of the B register is now compared with the internal memory MIN, and if this is not smaller than MIN, shift is directly made to a step #248, but if it is smaller than MIN, the value of B at a step #247 is substituted for MIN.

Figure 16:
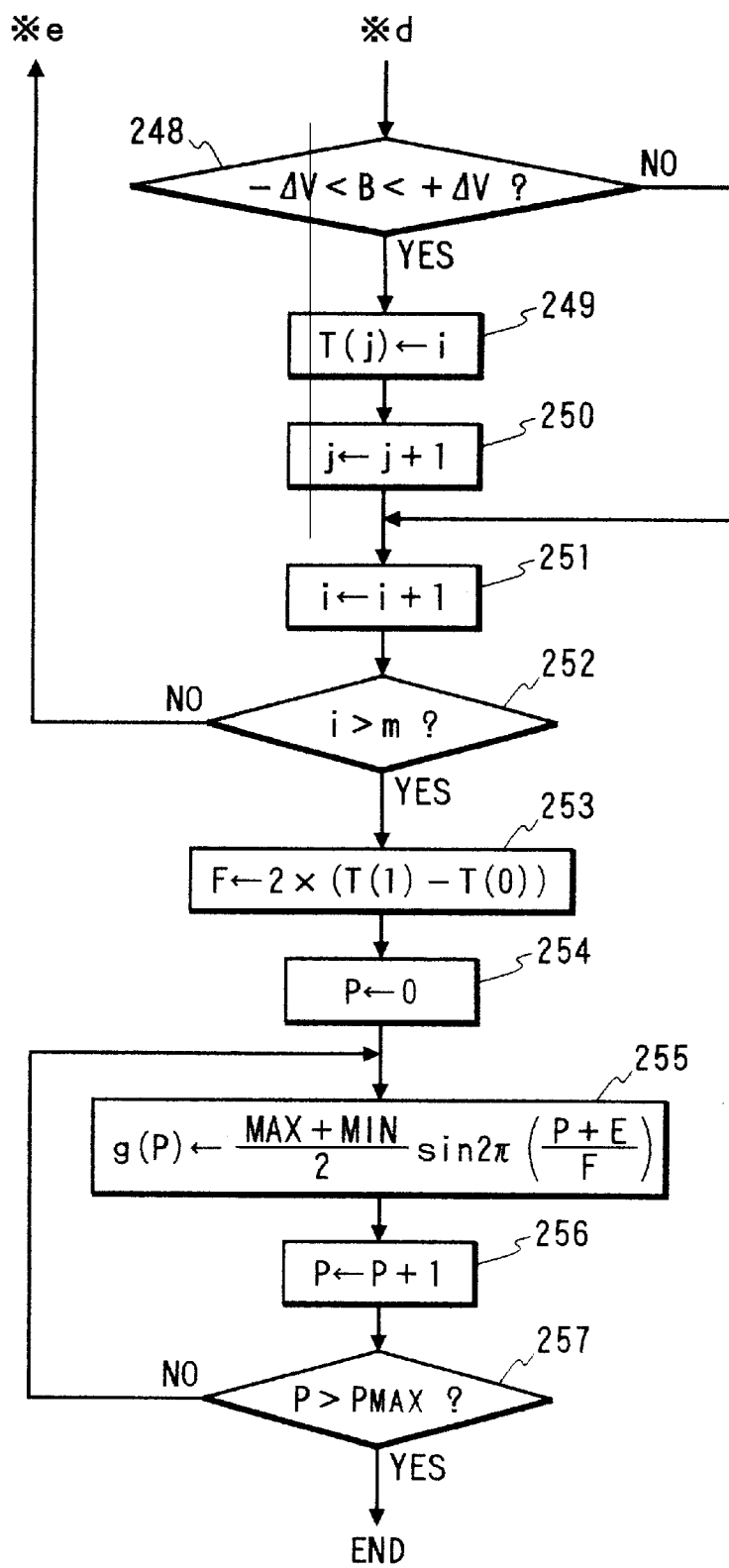
FIG. 16 is a flowchart showing the continuation of the operation of FIG. 15.

Next, at the step #248 of FIG. 16, whether the value of the B register is within a predetermined value range (−ΔV to +ΔV) and is substantially approximate to 0 is judged. If this value is not substantially approximate to 0, shift is directly made to a step #251, but if this value is substantially approximate to 0, at a step #249, the value of the data address setting counter i is set to T(j) (in the first case, T(0)), and at the next step #250, the value of j is counted up by 1. Subsequently, at a step #251, the value of the data address setting counter i is counted up by 1 to refer to the movement vector speed data before the current point of time, and at the next step #252, whether the value of i is greater than a predetermined value m is judged. If the value of i is not yet greater than the predetermined value m, it is judged that the reference to the image blur movement vector speed stored in the memory M(t−i) has not yet been completed, and shift is made to the step #242, but if the value of i is greater than m, it is judged that the reference to all memory M(t−i) data has been completed, and shift is made to a step #253.

Figure 18:
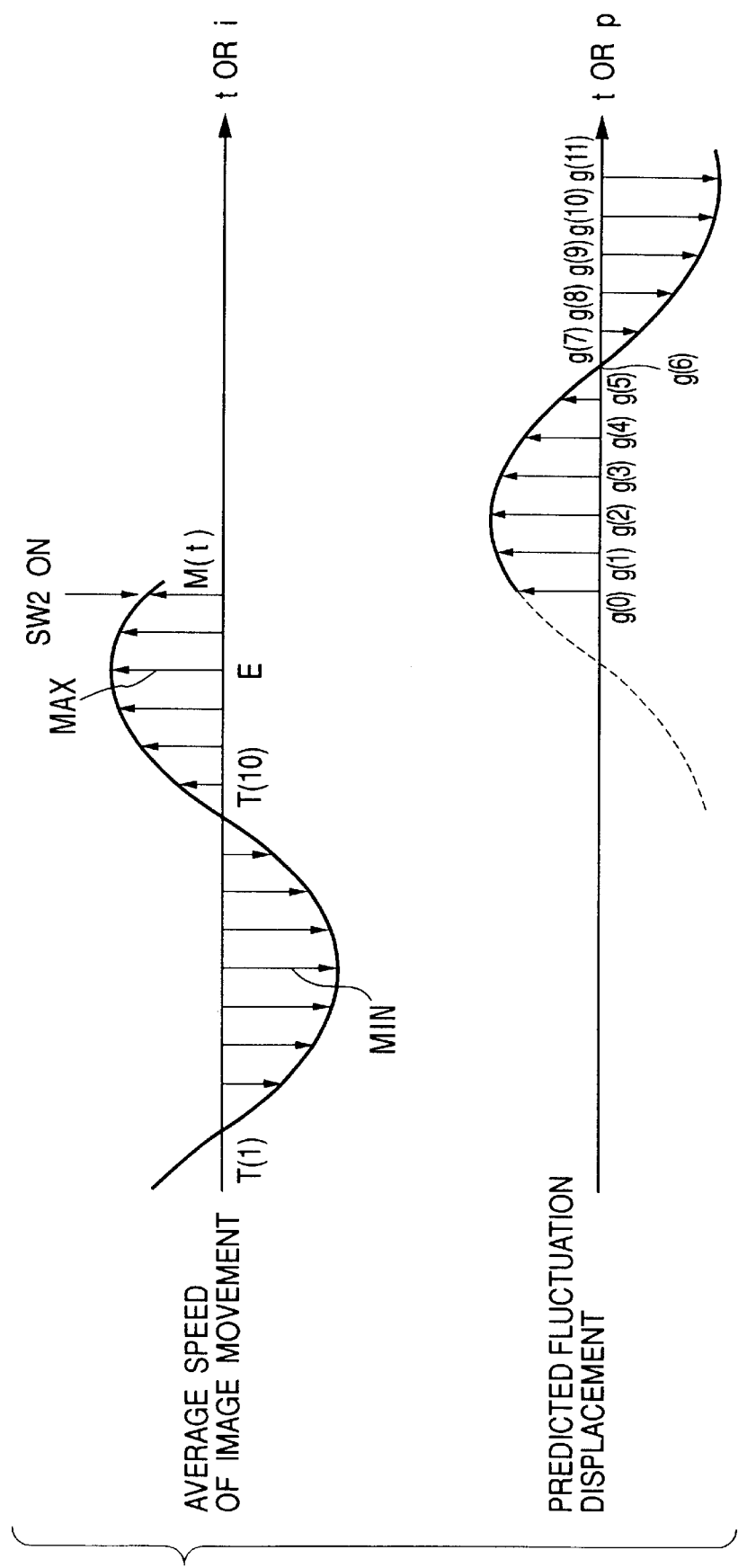
FIG. 18 also aids the illustration of the predicted fluctuation correction data calculation of FIGS. 15 and 16.

If the average image movement speed of the memory M(t−i) is a waveform having a certain periodicity as shown in FIG. 18, the amplitude of the waveform is set in the internal memories MAX and MIN found by the above-described method, and the frequency thereof is found from two data count values T(0) and T(1) at which the movement vector speed becomes nearly 0, and the phase component thereof is found from the value of the data counter E which is the value of MAX. In fact, the above-mentioned waveform represents the movement speed of the image and therefore, if it is to be converted into a predicted fluctuation displacement waveform, it is necessary to delay the phase component thereof by 90°.

Accordingly, at the step #253, the periodic time F of the predicted sine waveform is calculated from the calculation of $$2\times(T(1)-T(0)),$$

and at the next step #254, the counter value of a predicted waveform storing memory is reset to 0, and at the subsequent step #255, a predicted fluctuation waveform is found from the following expression:

$$\{(MAX+MIN)/2\}\sin 2\pi\{(P+E)/F\},$$

and this value is stored in the internal memory g(P). At a step #256, the value of P is counted up by 1 for the next data setting, whereafter at a step #257, whether the value of this P is greater than a predetermined value $P_{MAX}$ is judged. Accordingly, predicted fluctuation waveform data are successively stored until P becomes greater than $P_{MAX}$.

At a point of time whereat the storing of all data has been completed, the predicted fluctuation correction data calculation as previously described is completed.

After the predicted fluctuation correction data calculation has been effected by the method as described above, the program again goes back to FIG. 3, and at a step #118, the main mirror 24 and the sub-mirror 25 for the AF optical system in FIG. 1 are driven. At this point of time, no object light enters the image sensor 16. Next, at a step #119, an internal flag SHON indicating that the correction system is actually moved on the basis of the aforedescribed predicted fluctuation waveform is rendered to 1.

When the internal flag SHON becomes 1 as described above, in the sampling timer interrupted processing operation of FIG. 6 operating at each predetermined time period ts, shift is made from a step #158 to a step #161, where the predicted fluctuation waveform data g(P) (at first, g(0)) found by the above-described method is set in an internal memory G, and at the next step #162, the value of this G is added to the value of the correction system driving data D calculated from the outputs of the fluctuation sensors 4 and 6 before the step #157, and is again set in D register.

At the next step #163, the value of this D is outputted through the D/A converter 3 and therefore, a coil current proportional to the value of this D register flows to the driving coil 14, thus driving the correction lens 23 by a predetermined amount. Lastly, at a step #164, the value of the data address counter P is counted up by 1 for the next reading-out of the waveform data, and this interrupted processing operation is completed.

The correction optical system is actually driven by the object fluctuation predicted waveform found from the image sensor output before the start of exposure by the method as described above and the fluctuation sensor output, whereafter at the step #120 of FIG. 3, the driving of the leading curtain of the shutter unit 33 is started through the shutter driving circuit 35 of FIG. 1, and at the next step #122, a timer for setting the shutter speed is started, whereafter whether this timer has reached a predetermined time Tsh corresponding to the set shutter speed is judged. When the predetermined time Tsh is counted, the driving of the shutter trailing curtain is now started at a step #123, and at the subsequent step #124, whether the feeding of the shutter trailing curtain has been completed is judged.

When at the step #124, the completion of the feeding of the shutter trailing curtain is detected, at the next step #125, the flag SHON is reset to 0 and thus, in the flowchart of FIG. 6, the addition of the predicted fluctuation data to the driving of the correction system is stopped. Lastly, at a step #126, the main mirror 24 and the AF sub-mirror are returned to their original states, whereafter at a step #127, a predetermined amount of film feeding is effected and the release sequence is completed.

Thus, in the above-described first embodiment, design is made such that, depending on the operative state of the camera, the predicted fluctuation waveform found from the image sensor is changed.

(Second Embodiment)

The operations of the main portions of a camera according to a second embodiment of the present invention will now be described with reference to the flowcharts of FIGS. 19 and 20. The other operations and electrical and mechanical constructions of the camera are similar to those of the first embodiment and therefore need not be described.

First, at a step #260, the high-pass calculation result (i.e., the fluctuation speed output) from the fluctuation sensor signal-processed by the sampling timer interrupted processing shown in FIG. 6 is transferred to the A register. At the next step #261, whether the value of this A register is within the range of a predetermined value $-\alpha$ to $+\alpha$, i.e., within a predetermined speed range, is judged, and if it is within the predetermined speed range, it is judged that the photographer himself is trying ordinary photographing, and a step #269 and subsequent steps are executed.

Figure 15:
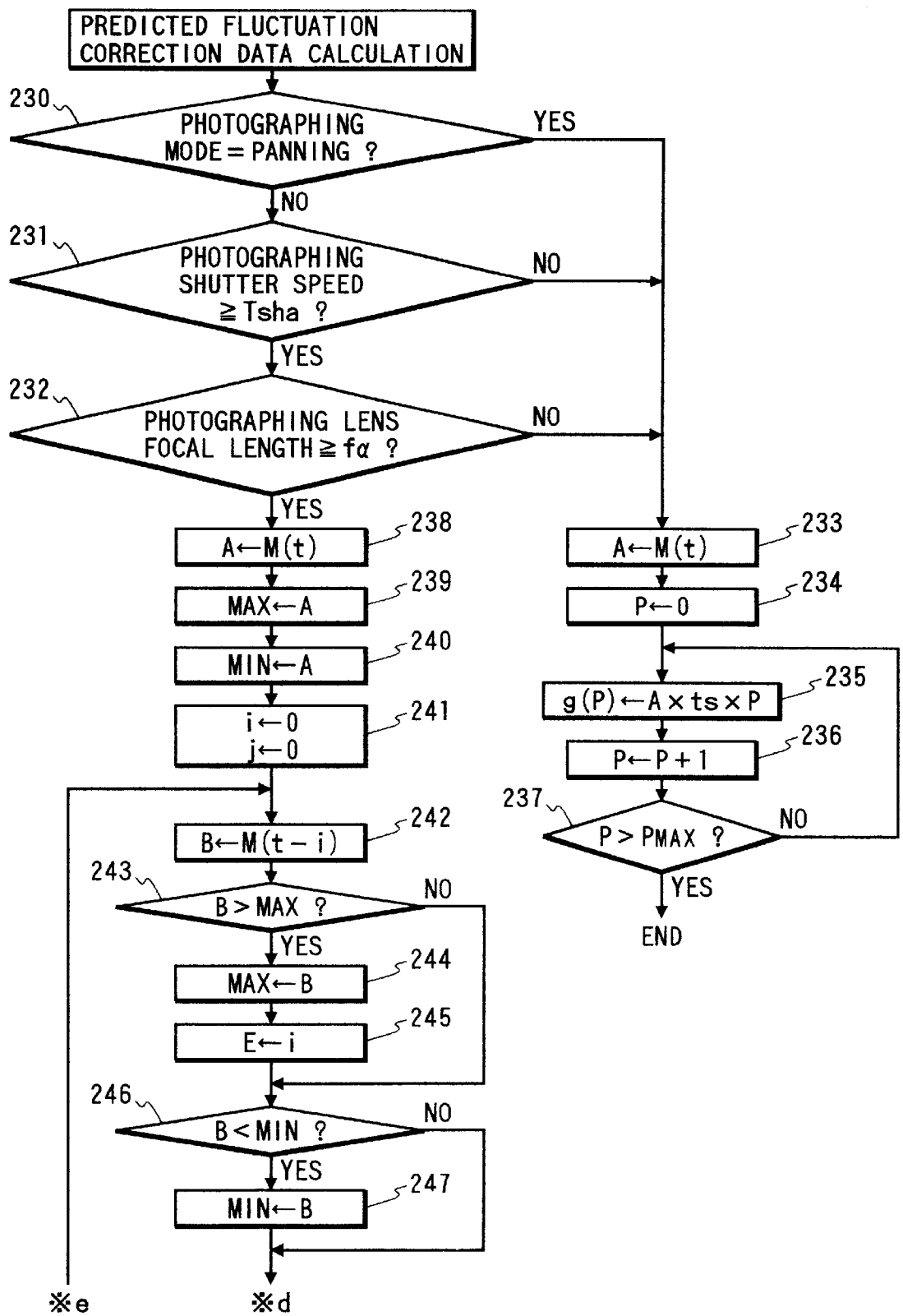
FIG. 15 is a flowchart showing the operation of predicted fluctuation correction data calculation shown in FIG. 3.
Figure 19:
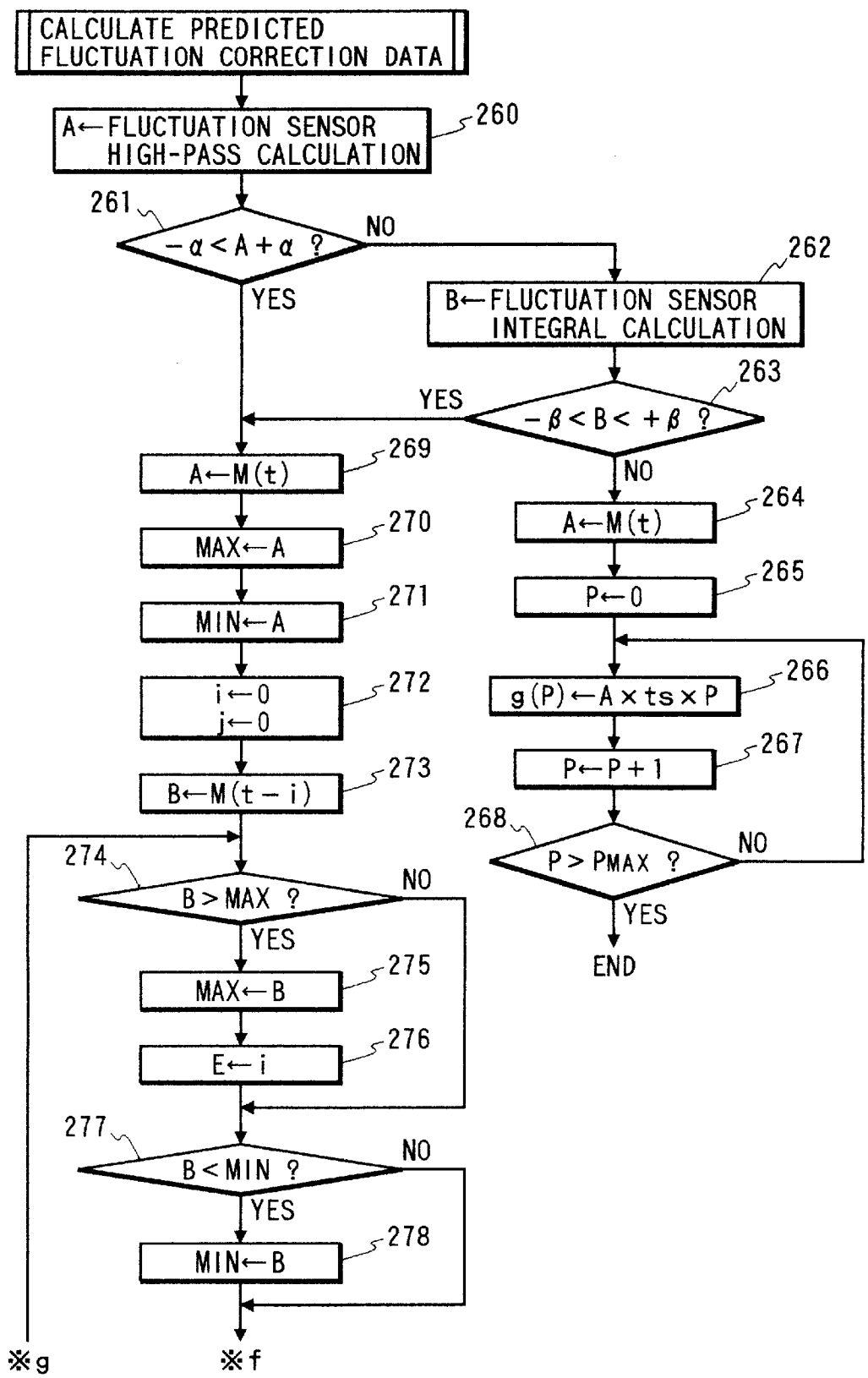
FIG. 19 is a flowchart showing the operation of the predicted fluctuation correction data calculation of a camera according to a second embodiment of the present invention.
Figure 20:
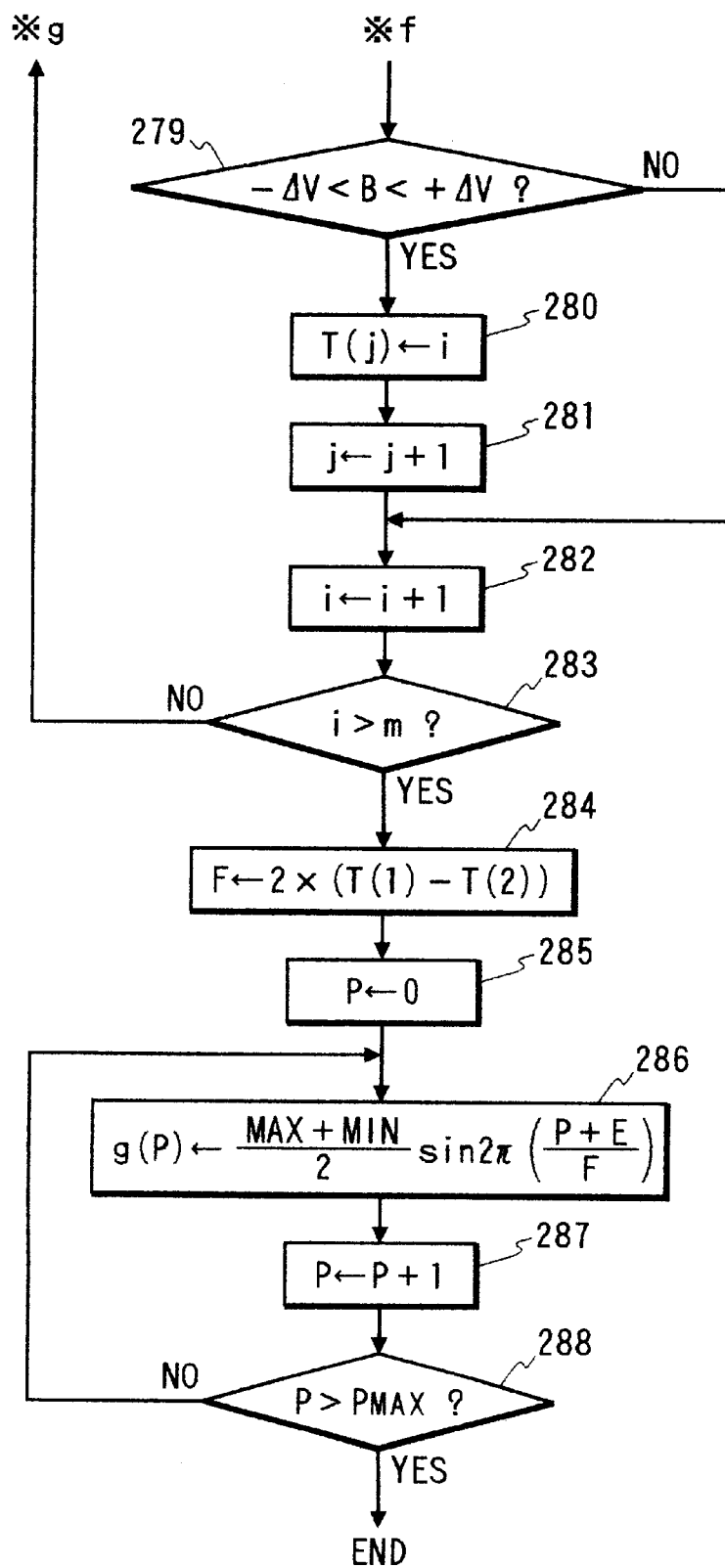
FIG. 20 is a flowchart showing the continuation of the operation of FIG. 19.
Figure 21:
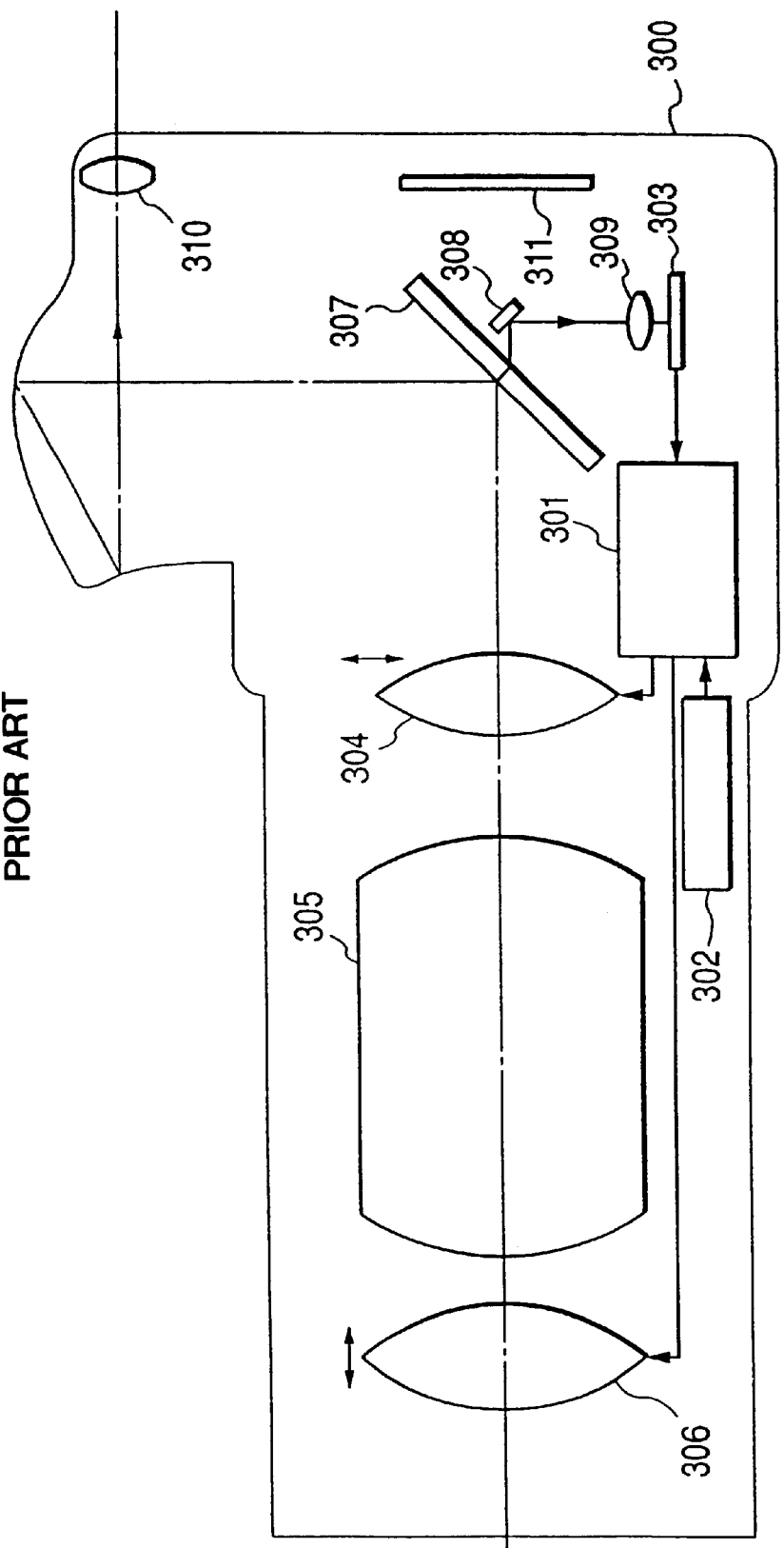
FIG. 21 shows the construction of the essential portions of a camera provided with a fluctuation preventing system according to the prior art.

The operations of the step #269 of FIG. 19 to the step #288 of FIG. 20 are entirely the same as those of the step #238 of FIG. 15 to the step #257 of FIG. 16, and at these steps, predicted fluctuation waveform data at a predetermined cycle and during a predetermined fluctuation is calculated and stored.

On the other hand, if at the step #261, the fluctuation sensor output is a predetermined speed or higher, shift is made to a step #262, where the fluctuation sensor integral calculation result calculated in the flowchart of FIG. 6 is transferred to the B register. At the next step #263, if the value of this B register, i.e., the fluctuation displacement output, is within the range of predetermined values $-\beta$ to $+\beta$, it is also judged that the photographer himself is trying ordinary photographing, and the step #269 and subsequent steps are executed.

However, if the output of the B register is not within the range of $-\beta$ to $+\beta$, both of the fluctuation speed and the fluctuation displacement exceed predetermined levels and in such case, the possibility of such photographing (for example, panning or the like) that the photographer himself is intentionally moving the camera is apparently high and therefore, the operations of the step #264 and subsequent steps are executed. The operations of the steps #264 to #268 of FIG. 19 are entirely similar to those of the steps #233 to #237 of FIG. 15, and the fluctuation output during exposure may be simply predicted from the image sensor output immediately before exposure.

As described above, in the second embodiment, what kind of photographing the photographer is trying (whether he is stationary or is moving the camera) is judged from the output of the mechanical fluctuation sensor (capable of detecting only the fluctuation of the photographer himself) before exposure, and depending on the state thereof, the predicting method from the image sensor during exposure is changed.

According to each of the above-described embodiments, an optimum predicted fluctuation parameter corresponding to the photographing mode of the camera is calculated from the movement of the object image capable of being detected by the image sensor, and the object fluctuation during exposure can be predicted and controlled in accordance with that parameter and therefore, optimum fluctuation correction can be realized in any case.

Also, the output of a mechanical sensor for detecting only the ordinary fluctuation of the photographer himself, discretely from the image sensor, is used, whereby the predicted fluctuation parameter from the image sensor can be changed and the object fluctuation during the camera shutter exposure can be predicted and controlled in accordance with that parameter and therefore, a higher degree of, and more accurate fluctuation correction can be realized.

The present invention is not restricted to the constructions of these embodiments, but may assume any construction which can achieve the functions shown in the appended claims or the functions the embodiments have.

As described above, according to the above-described embodiments, the manner of predicting image blur by the image blur predicting means is changed in accordance with the state of the set shutter speed or the focal length state of the photographing lens and further, the state of whether the photographing mode is the panning mode, or the manner of predicting image blur by the image blur predicting means is changed in accordance with the output of the inertial fluctuation sensor immediately before the start of exposure, i.e., in accordance with whether, for example, the amount of fluctuation is greater than a predetermined value, and during the exposure of the camera, of the outputs of the inertial fluctuation sensor and the image blur predicting means, at least the output from the image blur predicting means is supplied to the image blur correcting means to thereby effect image blur correction and therefore, depending on the operative state and fluctuating state of the camera, it is possible to calculate an optimum predicted fluctuation waveform for the image blur control during exposure.

In each of the above-described embodiments, the present invention has been described with respect to an example in which it is applied to a single-lens reflex camera provided with a mirror adapted to be retracted from the photographing optical path during exposure, but the present invention is not restricted thereto. When as shown in FIG. 1, the fluctuation preventing system is made into a closed loop construction and fluctuation preventing control is effected in real time, oscillation readily occurs and proper fluctuation preventing control may sometimes become impossible, but if design is made such that in such a case, as in each of the above-described embodiments, image blur prediction is effected and on the basis thereof, fluctuation preventing control is effected during exposure or the like, more proper fluctuation preventing control will become possible. When such a point is taken into account, even if the present invention is applied to a camera which does not have a mirror adapted to be retracted from the photographing optical path during exposure, for example, a lens shutter camera or an electronic still camera or the like, the effect of the invention will be tremendous. Further, the present invention can be applied to other optical instruments or other apparatuses and furthermore, can also be applied as: a construction unit.

Also, the inertial fluctuation sensor may be any one capable of detecting fluctuation such as an angular acceleration meter, an acceleration, meter, an angular speedometer, a speedometer, an angular displacement meter or a displacement meter, or further one using a method of detecting the fluctuation itself of an image.

Also, the image blur correcting means is not restricted to the shift optical system as shown in FIG. 5 for moving an optical member in a plane perpendicular to the optical axis, but may be light beam changing means such as a variable vertical angle prism or one for moving the photographing surface in an image field perpendicular to the optical axis.

Further, the present invention may be of a construction in which the above-described embodiments or the techniques thereof are suitably combined together.

The individual components shown in a schematic or block form in the drawings are all well known in the camera art and their specific construction and operation are not critical to the operation or best mode for carrying out the invention.

While the present invention has been described with respect to what is presently considered to be the preferred embodiments, it is to be understood that the invention is not restricted to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image blur prevention apparatus adapted to a camera having an exposure portion, comprising:

a first image blur detecting device that detects an image blur state of the camera;

a second image blur detecting device that detects an image blur state of an optical image of the camera, and outputs a detection signal;

a determining portion that determines a photographing operation state of the camera;

a calculating device having a first calculation program and a second calculation program, wherein said calculating device selects one calculation program from among the first and second calculating programs based on a determination result of said determining portion, and wherein said calculating device calculates a predicted blur signal, in accordance with the selected calculation program, based on the detection signal of said second image blur detection device; and an image blur prevention device that performs an image blur prevention operation, based on the detection signal of said first image blur detecting device and the predicted blur signal calculated by said calculating device, during a light exposing operation onto the exposure portion of the camera.

2. An apparatus according to claim 1, wherein said calculating device calculates the predicted blur signal during the exposing operation, on the basis of the detection signal of said second image blur detecting device before the light exposing operation onto the exposure portion of the camera.

3. An apparatus according to claim 1, wherein the first calculation program is a program in which the predicted blur signal is calculated by assuming that the detection signal of said second image blur detecting device is a linear signal, and the second calculation program is a program in which the predicted blur signal is calculated by assuming that the detection signal of said second image blur detecting device is a wave form signal having a periodic characteristic.

4. An apparatus according to claim 1, wherein said determining portion determines the photographing operation state of the camera by comparing an exposing time on the exposure portion of the camera with a predetermined time.

5. An apparatus according to claim 4, wherein in a case where the exposing time is shorter than the predetermined time, said calculating device executes the first calculation program by assuming that the detection signal of said second image blur detecting device is a linear signal.

6. An apparatus according to claim 4, wherein in a case where the exposing time is longer than the predetermined time, said calculating device executes the first calculation program by assuming that the detection signal of said second image blur detecting device is a wave form signal having a periodic characteristic.

7. An apparatus according to claim 1, wherein said determining portion determines the photographing operation state of the camera by comparing a photographing focal distance of the camera with a predetermined focal distance.

8. An apparatus according to claim 7, wherein in a case where the photographing focal distance is shorter than the predetermined focal distance, said calculating device executes the first calculation program by assuming that the detection signal of said second image blur detecting device is a linear signal.

9. An apparatus according to claim 7, wherein in a case where the photographing focal distance is longer than the predetermined focal distance, said calculating device executes the first calculation program by assuming that the detection signal of said second image blur detecting device is a wave form signal having a periodic characteristic.

10. An apparatus according to claim 1, wherein said second image blur detecting device includes a sensor that detects a focus detecting state of the camera.

* * * * *

UNITED STATES PATENT AND TRADEMARK OFFICE
CERTIFICATE OF CORRECTION

PATENT NO. : 6,344,876 B2  
DATED : February 5, 2002  
INVENTOR(S) : Yasuhiko Shiomi It is certified that error appears in the above-identified patent and that said Letters Patent is hereby corrected as shown below:

Column 2,
Line 54, "first;" should read -- first --.

Column 4,
Line 10, "or" should read -- on --.
Line 53, "diagram" should read -- diagram showing --.

Column 7,
Line 17, "Cn)" should read -- $c_n$) --.
Line 47, "likewise" should read -- similarly --.

Column 13,
Line 46, "of" (2nd occurrence) should be deleted.

Column 14,
Line 59, "as:" should read -- as --.
Line 62, "accelerating" should read -- acceleration --.

Signed and Sealed this

Eighteenth Day of June, 2002

Attest:

Attesting Officer

JAMES E. ROGAN  
Director of the United States Patent and Trademark Office